(12) United States Patent (10) Patent No.: US 10,930,056 B2
Kim et al. (45) Date of Patent: Feb. 23, 2021

(54) ELECTRONIC DEVICE FOR GENERATING IMAGES HAVING RENDERING QUALITIES DIFFERING BY VIEW VECTOR

(71) Applicant: Samsung Electronics Co., Ltd, Suwon-si (KR)

(72) Inventors: Min Jung Kim, Hwaseong-si (KR); Yo Han Lee, Seongnam-si (KR); Cheol Ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,039

(22) PCT Filed: Jan. 4, 2018

(86) PCT No.: PCT/KR2018/000176
§ 371 (c)(1),
(2) Date: Jul. 3, 2019

(87) PCT Pub. No.: WO2018/128414
PCT Pub. Date: Jul. 12, 2018

(65) Prior Publication Data
US 2019/0333265 A1 Oct. 31, 2019

(30) Foreign Application Priority Data
Jan. 4, 2017 (KR) .................. 10-2017-0001235

(51) Int. Cl.
*G06T 15/20* (2011.01)
*G02B 27/00* (2006.01)
(Continued)

(52) U.S. Cl.
CPC .......... *G06T 15/20* (2013.01); *G02B 27/0093* (2013.01); *G02B 27/017* (2013.01);
(Continued)

(58) Field of Classification Search
CPC ......... G06T 15/20; G06T 15/005; G06T 7/20; G06T 7/285; G02B 27/0093;
(Continued)

(56) References Cited

U.S. PATENT DOCUMENTS 8,237,740 B2 8/2012 Opala et al.
2010/0134494 A1 6/2010 Lim et al.
(Continued)

FOREIGN PATENT DOCUMENTS

| JP | 2002197016 A | 7/2002 |
| JP | 2016066149 A | 4/2016 |
| WO | 2016/135498 A1 | 9/2016 |

OTHER PUBLICATIONS

International Search Report dated Apr. 19, 2018 in connection with International Patent Application No. PCT/KR2018/000176, 2 pages.

*Primary Examiner* — William A Beutel

(57) ABSTRACT

Disclosed is an electronic device. The electronic device includes at least one processor, wherein the at least one processor generates a plurality of images corresponding to a plurality of view vectors associated with one point on a virtual three-dimensional space, sets a quality of at least one image of the plurality of images with a higher quality than remaining images, and synthesizes the plurality of images including the at least one image. In addition, various embodiments understood from the disclosure may be possible.

12 Claims, 16 Drawing Sheets

(51) Int. Cl.
*G02B 27/01* (2006.01)
*G06T 15/00* (2011.01)

(52) U.S. Cl.
CPC ...... *G06T 15/005* (2013.01); *G02B 2027/014* (2013.01); *G02B 2027/0138* (2013.01); *G02B 2027/0187* (2013.01)

(58) Field of Classification Search
CPC .......... G02B 27/017; G02B 2027/0138; G02B 2027/014; G02B 2027/0187; H04L 29/06; H04N 5/265
See application file for complete search history.

(56) References Cited

U.S. PATENT DOCUMENTS

| | | | |
|---|---|---|---|
| 2015/0244981 A1 | 8/2015 | Johnson | |
| 2015/0346832 A1* | 12/2015 | Cole | H04L 65/4069 345/156 |
| 2016/0260196 A1* | 9/2016 | Roimela | H04N 21/234363 |
| 2016/0357017 A1 | 12/2016 | Nishidate et al. | |
| 2017/0111595 A1* | 4/2017 | Soni | H04L 65/403 |
| 2017/0293971 A1* | 10/2017 | Dollens | G06Q 30/0601 |

* cited by examiner

ELECTRONIC DEVICE FOR GENERATING IMAGES HAVING RENDERING QUALITIES DIFFERING BY VIEW VECTOR

CROSS-REFERENCE TO RELATED APPLICATIONS

This application is a 371 of International Application No. PCT/KR2018/000176 filed on Jan. 4, 2018, which claims priority to Korean Patent Application No. 10-2017-0001235 filed on Jan. 4, 2017, the disclosures of which are herein incorporated by reference in their entirety.

BACKGROUND

1. Field

Embodiments disclosed herein relate to an electronic device that generates images having rendering qualities varying with view vectors.

2. Description of Related Art

A content creating server constructs a 3D graphics world through a 3D application and a 3D graphics library, and creates (i.e., render) a screen by positioning a virtual camera at a position in the 3D graphics world. The content creating server transmits the rendered screen to a content reproducing device.

In 3D game streaming and 3D movie streaming services, it is necessary to render images at various viewpoints at one location to render a wide region and synthesize them to be content of one screen to generate 360-degree content (e.g., content including images in all directions (front, rear, left, right, up, and down directions with respect to one point) for the 3D graphics world using existing techniques. For example, the 360-degree content may be an image and/or video content that further include images of adjacent scenes that are not displayed on a screen other than the image to be displayed on the screen. For example, an image that is not displayed on the screen may be displayed on the screen in response to an operation of the user who is enjoying the content (e.g., a head movement operation of a user of a head mount device). In various examples, the 360-degree content may not be an image including all directions of 360 degrees. For example, it may be an image including a range slightly narrower than 360 degrees, such as 180 degrees, 270 degrees in a left-right direction.

A 360-degree content creating server requires a lot of calculation amount for rendering because it needs to render images at various viewpoints. For example, when several users use 360-degree content on a game server, there is a problem in that the amount of rendering computation becomes large and the load on the server increases, making real-time rendering difficult.

The prior art does not render omnidirectional images of three-dimensional 360-degree content due to a large amount of computation, but renders only a region corresponding to a user's gaze.

Various embodiments of the disclosure are capable of efficiently rendering omnidirectional images of three-dimensional 360-degree content by making the rendering qualities of images different from one another for view vectors.

SUMMARY

An electronic device according to an embodiment disclosed in the disclosure includes at least one processor, wherein the at least one processor generates a plurality of images corresponding to a plurality of view vectors associated with one point on a virtual three-dimensional space, sets a quality of at least one image of the plurality of images with a higher quality than remaining images, and synthesizes the plurality of images including the at least one image.

An electronic device according to an embodiment disclosed in the disclosure includes a display, at least one sensor that obtains gaze information of a user corresponding to the electronic device, and at least one processor operatively connected to the display and the at least one sensor, wherein the at least one processor generates a plurality of images corresponding to a plurality of view vectors associated with one point on a virtual three-dimensional space, sets a quality of at least one image of the plurality of images with a higher quality than remaining images based on the gaze information, synthesizes the plurality of images including the at least one image, and displays the synthesized image through the display.

In addition, a storage medium according to an embodiment disclosed in the disclosure includes instructions, when executed by an electronic device that transmits an image to an external electronic device, causing the electronic device to set a plurality of rendering regions corresponding to view vectors associated with one point on a virtual three-dimensional space, generate images, rendering a rendering quality of at least one of the plurality of rendering regions with a higher quality than the rendering qualities of the remaining rendering regions, generate a plurality of images corresponding to the plurality of view vectors by rendering the plurality of rendering regions based on the set rendering qualities, synthesize the plurality of images including the at least one image, and transmit the synthesized image to the external electronic device.

According to the embodiments disclosed herein, a plurality of images contained in 360-degree content have different rendering qualities, enabling an image to be efficiently rendered.

In addition, the efficient rendering reduces the size of image data, and time required for streaming the image.

In addition, various effects may be provided that are directly or indirectly understood through the disclosure.

BRIEF DESCRIPTION OF THE DRAWINGS

The accompanying drawings incorporated herein illustrate preferred embodiments of the disclosure and provide further understanding of the technical idea of the disclosure together with the description, and therefore the disclosure should not be construed as being limited to the matters described in such drawings.

DETAILED DESCRIPTION

Figure 1:
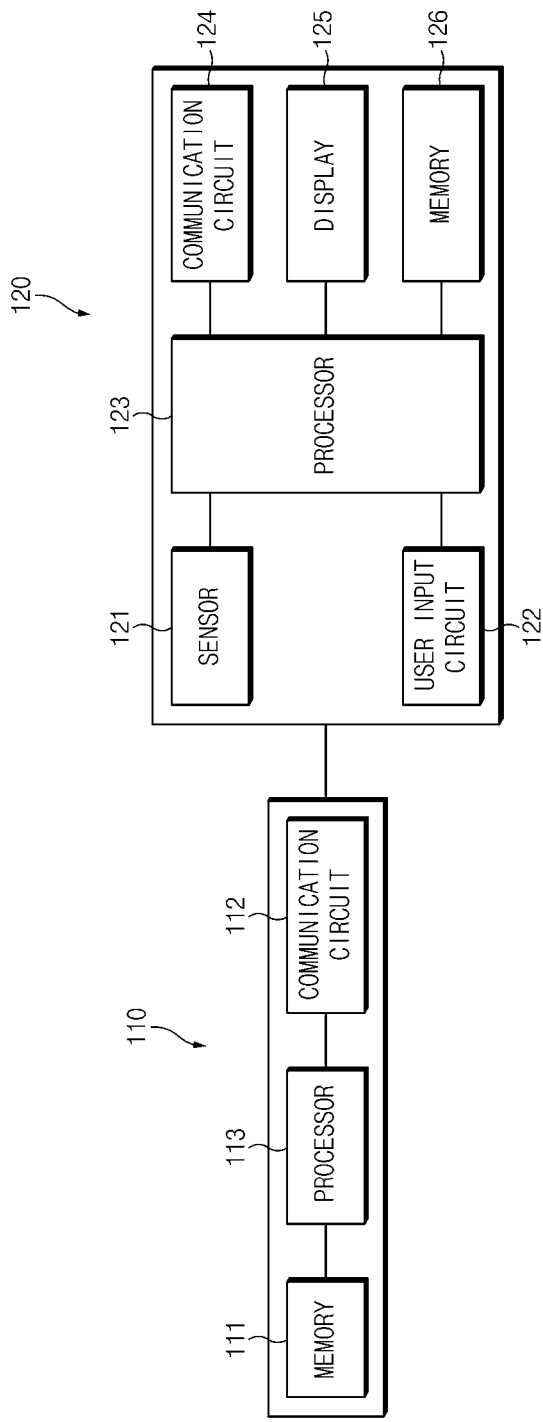
FIG. 1 is a block diagram illustrating a server that provides images and a user terminal that displays images, according to various embodiments of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync℧, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

First, referring to FIG. 1, description will be given by taking an example in which a server 110 generates an image of a user, transmits the image to a user terminal 120, and the user terminals 120 displays the received image received.

FIG. 1 is a block diagram illustrating a server that provides images and a user terminal that displays images, according to various embodiments of the disclosure.

Referring to FIG. 1, the server 110 may include, for example, a memory 111, a communication circuit 112, and at least one processor 113, and the user terminal 120 may include, for example, at least one sensor 121, a user input circuit 122, a processor 123, a communication circuit 124, a display 125, and a memory 126. In addition, the server 110 and the user terminal 120 may communicate with each other via communication circuits 112 and 124 respectively. However, the components illustrated in FIG. 1 are not essential, and therefore, the server 110 and the user terminal 120 having more or fewer components may be implemented.

A configuration of the server 110 according to an embodiment of the disclosure will be described.

The memory 111 may store instructions or data related to at least one other component of the server 110. According to one embodiment, the memory 111 may store 3D computer graphics software, a 3D application program (e.g., a 3D program such as a game or a movie) rendering a plurality of rendering screens in a virtual three-dimensional space, a plurality of pieces of 2D image data rendered by the 3D application program, and the like.

In various embodiments, the memory 111 may further include gaze information of a user received from the user terminal 120 by the communication circuit 112.

In various embodiments, the memory 111 may include selection input information for an object (or a specific location and/or a specific direction) included in an image. The selection input information for the object may be generated by the 3D application program or generated based on a selection input obtained by the user input circuit 122 of the user terminal 120 to be described later.

The communication circuit 112 may allow the server 110 to communicate with the user terminal 120. For example, the communication circuit 112 may obtain the gaze information of the user from the user terminal 120. The communication circuit 112 may obtain sensing information for generating gaze information from the user terminal 120. In addition, the communication circuit 112 may transmit an image generated by the processor 113 to the user terminal 120.

The at least one processor 113 may be operatively connected to the memory 111 and the communication circuit 112 and may control overall operation of the server 110. For example, the at least one processor 113 may generate (e.g., render) a plurality of images corresponding to a plurality of view vectors associated with a point on a virtual three-dimensional space, synthesize the generated plurality of images, and transmit a synthesized image to the user terminal 120 via the communication circuit 112.

The at least one processor 113 may render at least one rendering region of a plurality of rendering regions at a higher quality than the remaining rendering regions. A specific operation in which the processor 113 renders a rendering region will be described in detail below.

The processor 113 may synthesize a plurality of images into one image by stitching or the like. For example, the synthesized image may be a 360-degree image reproduced through a VR (Virtual Reality) device or the like.

The processor 113 may set at least one of settings for a size of a view frustum, settings for the number of rendering light sources, settings for rendering shading, settings for a resolution, settings for a rendering texture resolution, and settings for a level of detail of the modeling data with respect to at least one image generated with a high quality, differently from those of the remaining images. Details of operation of allowing rendering qualities to be ranked in the processor 113 will be described later.

For example, the processor 113 may include a CPU processor and/or a GPU processor. The processor may include a plurality of processors.

When the server 110 includes a plurality of processors 113 (e.g., a plurality of GPU processors), a plurality of images corresponding to the plurality of view vectors may be respectively generated by the plurality of processors 113. The plurality of images may be generated in parallel.

The processor 113 may perform rendering with quality determined based on at least one of a state of the server 110, a communication state between the server 110 and the user terminal 120, a state of the user terminal 120, performance of the server 110, and performance of the user terminal 120.

For example, the processor 113 may maintain rending qualities of all rendering regions the same when a state (e.g., the available capacities or the like of the processors 113 and 123, the available capacities of the memories 111 and 126, the battery state, current consumption state, or heat generation state of the electronic device, or the like) of the electronic device (the server 110 or the user terminal 120) is favorable, and when the state of the electronic device (the server 110 or the user terminal 120) is unfavorable, lower the rending quality of at least one of the plurality of rendering regions.

As another example, the processor 113 of the server 110 may check a network condition with the user terminal 120 by identifying an RTT (Round Trip Time) at the time of connection with the user terminal 120 or during the connection. For example, the processor 113 of the server 110 may check a network condition with the user terminal 120 by measuring the number of bits of data, which has been transmitted, from a data queue transmitted to the user terminal 120 for a predetermined time period. In various embodiments, the data queue may be a data queue which is managed by an application program (e.g., an application) or a communication data queue which is managed by a communication protocol layer (e.g., TCP protocol).

According to various embodiments, the processor 113 of the server 110 may set the rendering qualities of the plurality of rendering regions according to the checked network condition. For example, when the network conditions are unfavorable (e.g., the RTT time is equal to or greater than a threshold in the user terminal 120), the processor 113 of the server may set at least one (a scene corresponding to a moving direction of virtual cameras) of the plurality of rendering regions as a rendering region to perform high-quality rendering, and render the remaining rendering regions with low quality.

A configuration of the user terminal 120 according to an embodiment of the disclosure will be described below again with reference to FIG. 1.

The at least one sensor 121 may obtain sensing information related to the user's gaze. For example, the sensor 121 may obtain speed variation information of the user terminal 120, tilt information of the user terminal 120, rotation rate information of the user terminal 120, information on an image to be displayed on the display 125 by the user terminal 120, user gaze tracking information, and the like.

The at least one sensor 121 may include at least one of an acceleration sensor, a gyro sensor, a geomagnetic sensor, a magnetic sensor, a proximity sensor, a gesture sensor, a grip sensor, a biometric sensor, and an eye tracker. However, the type of the sensor 121 is not limited to the example.

The user input circuit 122 may obtain a selection input for an object in a virtual three-dimensional space from a user. For example, the user input circuit 122 may obtain a selection input for an object (or a specific position or a specific vector (e.g., a gaze direction of a user or a view vector of a screen)) displayed on the display 125 from the user. In another embodiment, the user terminal 120 may not include the user input circuit 122.

The processor 123 may be operatively/electrically connected to the at least one sensor 121, the user input circuit 122, the communication circuit 124, the display 125 and the memory 126, and may control overall operation of the user terminal 120.

For example, the processor 123 may generate gaze information based on the sensing information obtained by the sensor 121, and transmit the gaze information to the server 110 through the communication circuit 124.

Further, in various embodiments, the processor 123 may transmit information on the selectively-input object to the server 110 via the communication circuit 124 based on the selection input for the object obtained by the user input circuit 122. The processor 123 may display an image received via the communication circuit 124 through the display 125. That is, the processor 123 may map the received image onto a virtual three-dimensional space, render a rendering region corresponding to gaze of the user of the user terminal 120 (e.g., head movement of a user of a HMD device), and display the image on the display 125.

The memory 126 may store instructions or data related to at least one other component of the user terminal 120. According to one embodiment, the memory 126 may store a 3D application program (e.g., a 3D viewer program) that renders an image in a virtual three-dimensional space using the image received from the server 110.

In the example of FIG. 1, the server 110 may generate an image, and the user terminal 120 may not only display an image from the server 110 but also generate and display an image by itself.

When the user terminal 120 generates an image, the processor 123 of the user terminal 120 may perform the operation of the processor 113 in FIG. 1 and the memory 126 may store the information of the memory 111 in FIG. 1.

That is, the processor 123 of the user terminal 120 may generate a plurality of images corresponding to a plurality of view vectors associated with one point on a virtual three-dimensional space, and synthesize the plurality of images generated. In an embodiment, the processor 123 may render at least one of the plurality of rendering regions with a higher quality than the remaining rendering regions.

In addition, the memory 126 of the user terminal 120 may store instructions or data related to at least one other component of the user terminal 120, 3D computer graphics software, a 3D application program that renders a plurality of rendering screens in a virtual three-dimensional space, a plurality of 2D image data rendered by the 3D application program, and the like.

In the example of FIG. 1, the server 110 may generate an image and transmit the generated image to a second server (not illustrated). The user terminal 120 may receive an image from the second server. For example, according to embodiments of the disclosure, the server 110 may be an electronic device in the type of a user terminal (e.g., a personal computer or a mobile device).

Figure 2:
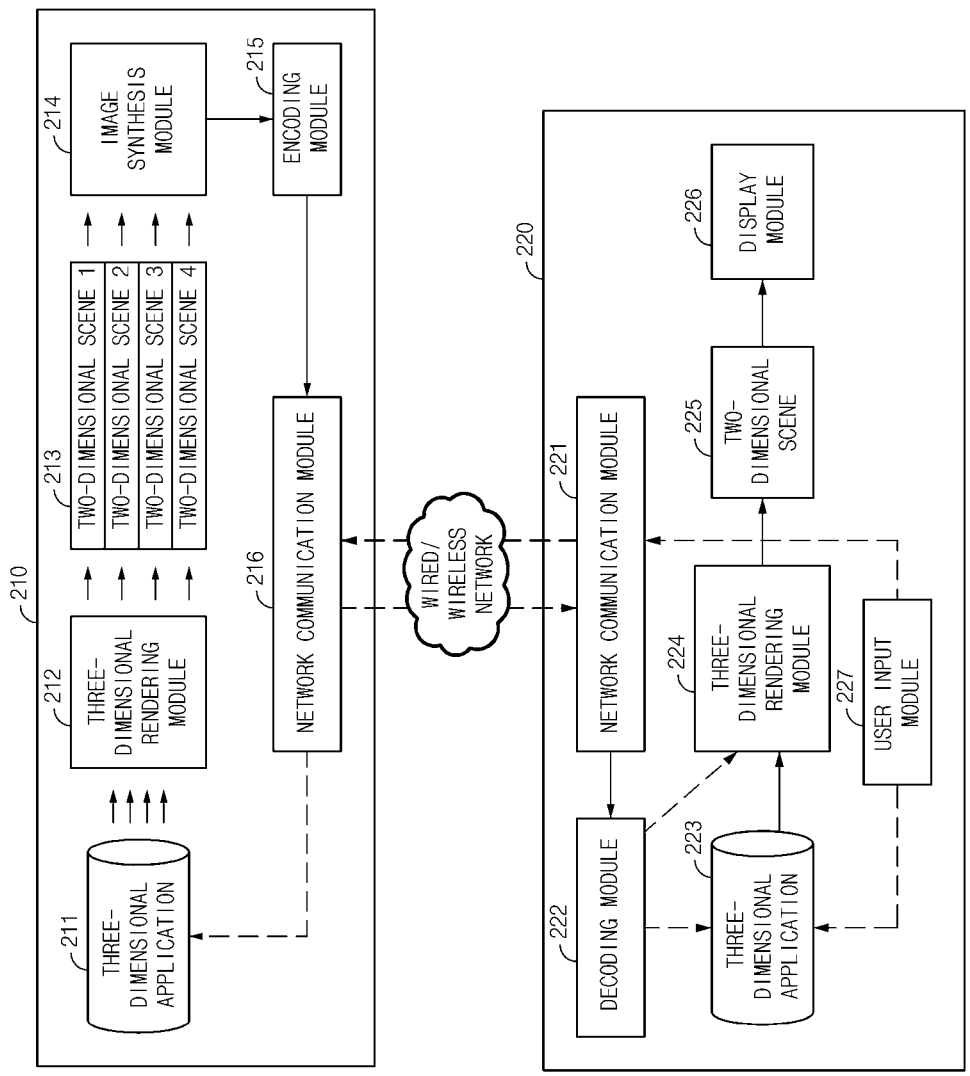
FIG. 2 is a block diagram illustrating software modules in a server for providing an image and a user terminal for displaying an image according to various embodiments of the disclosure.

FIG. 2 is a block diagram illustrating software modules in a server for providing an image and a user terminal for displaying an image according to various embodiments of the disclosure.

Referring to FIG. 2, a server 210 may include a three-dimensional application 211, a three-dimensional rendering module 212, a plurality of two-dimensional scenes 213, an image synthesis module 214, an encoding module 215, a network communication module 216, and the like. A user terminal 220 may include a network communication module 221, a decoding module 222, a three-dimensional application 223, a three-dimensional rendering module 224, a two-dimensional scene 225, a display module 226, a user input module 227, and the like.

The three-dimensional application 211, the three-dimensional rendering module 212, the image synthesis module 214 and the encoding module 215 in the server 210 may be operated through execution of instructions or program codes stored in the memory 111 by the processor 113 and the network communication module 216 may be operated by the communication circuit 112.

In addition, the network communication module 221 may be implemented by the communication circuit 124 and the decoding module 222, the three-dimensional application 223 and the three-dimensional rendering module 224 may be operated through the execution of instructions or program codes stored in the memory 111 by the processor 113. The display module 226 may correspond to the display 125 and the user input module 227 may correspond to the user input circuit 122.

The three-dimensional application 211 of the server 210 may read (or receive) three-dimensional modeling world data from storage (or another electronic device) and load the data into the memory. The three-dimensional application 211 may be a 3D movie, a game application, or the like.

The three-dimensional application 211 may execute three-dimensional content, such as a game or a movie, to generate 360-degree content such as an image or a moving image that may be displayed through a display. According to an embodiment of the disclosure, the three-dimensional application 211 (e.g., three-dimensional modeling world data) may include a plurality of virtual cameras to be described later.

When the three-dimensional application 211 is a game application, the three-dimensional application 211 may generate the 360-degree content based on operation of a game player in various embodiments. For example, a reference point of a virtual camera, which will be described later, may be moved according to operation for movement of a game character in a game player. Further, in various embodiments, a rendering region to be rendered with a high quality may be selected based on gaze information of a game player or a moving direction of the character according to operation of the game player.

The three-dimensional rendering module 212 may render a three-dimensional modeling world and include a three-dimensional graphics library (e.g., openGL, openGL es, directX, or the like). According to various embodiments, the three-dimensional application 211 or the three-dimensional rendering module 212 may be configured such that virtual cameras are rendered in parallel. For example, the plurality of processors 113 may be set to respectively render images corresponding to a plurality of virtual cameras.

The plurality of two-dimensional scenes 213 may be two-dimensional scene data rendered by the three-dimensional rendering module 212. In the disclosure, the number of the two-dimensional scenes 213 may not be limited to a specific number. According to one embodiment, the resolutions of the two-dimensional scenes may be different from each other. For example, a server that renders six scenes corresponding to front, back, left, right, up, and down directions may have six pieces of two-dimensional scene data, and the two-dimensional scenes corresponding to the up and down directions among the six scenes may have a lower resolution than the remaining two-dimensional scenes.

The image synthesis module 214 may synthesize the two-dimensional scenes to be a single image (e.g., a 360-degree image). In one embodiment, a synthesis data format may be a format that may be supported by a content reproducing device (e.g., the user terminal 120). For example, the image synthesis module 214 may synthesize the plurality of two-dimensional scenes in the format of a three-dimensional texture, such as a cubemap format or an equirectangular format, used in the content reproducing device.

The encoding module 215 may compression-encode the synthesized image in a specific format. Examples of a format that the encoding module 215 encodes may include MP4-H.264, H.265, jpeg, HDMI, and DP (displayport) format, or the like.

The network communication module 216 may be a wireless communication module such as 3G, 4G, or WIFI, or a wired communication module such as USB, HDMI, or DP (displayport). The network communication module 216 may transmit the encoded data to an external electronic device.

The network communication module 221 of the user terminal 220 may be a wireless communication module such as 3G, 4G, or WIFI, or a wired communication module such as USB, HDMI, or DP (Displayport). The network communication module 221 may receive the 360-degree content data from the server 210.

The decoding module 222 may decompress and decode the received data to obtain an image synthesized by the image synthesis module 215 of the server 210. The obtained image may be used as a texture in a three-dimensional application.

The three-dimensional application 223 may be a 360-degree content viewer for reproducing the received 360-degree content and may be a three-dimensional application including three-dimensional modeling data of the 360-degree image viewer.

The 360-degree content viewer may render a 360-degree image based on gaze information of a user who looks at the 360-degree image. That is, the game player described above may affect an operation of generating the 360-degree content, and the user who looks at the 360-degree image may affect an operation of reproducing the 360 content.

The three-dimensional application 223 may include, for example, world model data for reproducing the 360-degree content, and render a view port which the user is to look at by placing a virtual camera in a world model. The three-dimensional application 223 may texture the synthesized 360-degree content in the world model (movie texture). According to one embodiment, the three-dimensional application 223 may perform stereo rendering using two virtual cameras.

According to one embodiment, the three-dimensional application 223 may determine a configuration of the 360-degree world corresponding to information on the number of virtual cameras and/or quality information for each scene which are contained in the 360-degree content (received from the server 210). For example, different world models (e.g., sphere, cylinder, cubic, and octa models) may be used depending on the number of virtual cameras.

The three-dimensional rendering module 224 is a rendering module that renders a three-dimensional modeling world and may include a 3D graphics library (e.g., openGL, openGL es, or directX).

The two-dimensional scene 225 may be two-dimensional scene data of which rendering has completed, and may be output through the display module 226. The two-dimensional scene 225 may be subjected to distortion compensation processing corresponding to lens distortion of a head mount display (HMD) and be output to a display.

The display module 226 may be an internal or external display device of the user terminal 220 and may output the two-dimensional scene 225.

The user input module 227 may include various sensors such as an acceleration sensor to sense a user's motion (e.g., head tracking, position tracking, eye tracking, camera-based hand gesture recognition, or the like).

In various embodiments, the server 210 may not include the image synthesis module 214. The server may transmit a plurality of two-dimensional scenes to the user terminal 220 via the network communication module 216. In an embodiment, the user terminal 220 may further include an image synthesis module (not illustrated) to synthesize the received two-dimensional scenes in the format of a three-dimensional texture.

In various embodiments, the server 210 may not include the encoding module 215. The server may transmit the plurality of two-dimensional scenes 213 or the image synthesis module 214 to the user terminal 220 via the network communication module 216 without performing compression-encoding. In this regard, the user terminal 220 may not include the decoding module 222.

A specific operation in which the processor 113 or 123 of the electronic device (the server 110 or the user terminal 120) illustrated in FIG. 1 generates an image will be described below with reference to FIGS. 3 to 8B.

As described above, both the processor 113 of the server 110 and the processor 213 of the user terminal 120 which are illustrated in FIG. 1 may generate a plurality of images corresponding to a plurality of view vectors associated with a point on a virtual three-dimensional space. According to one embodiment, the processor 113 of the server 110 and the processor 213 of the user terminal 120 may generate an image such that at least one of the plurality of images is rendered with a higher quality than the remaining images, and synthesize the plurality of images including the at least one image. Hereinafter, the processor 113 of the server 110 and the processor 213 of the user terminal, which are illustrated in FIG. 1, will be collectively referred to as a 'processor' without distinguishing between them.

The processor 113 or 123 may generate a plurality of images corresponding to a plurality of view vectors associated with a point on a virtual three-dimensional space. For example, the processor 113 or 123 may set a plurality of rendering regions based on virtual cameras corresponding to the plurality of view vectors in the virtual three-dimensional space, and render and generate the plurality of images based on the set rendering regions.

First, referring to FIGS. 3 to 5, an operation in which the processor 113 or 123 sets a plurality of rendering regions according to various embodiments of the disclosure will be described.

Figure 3:
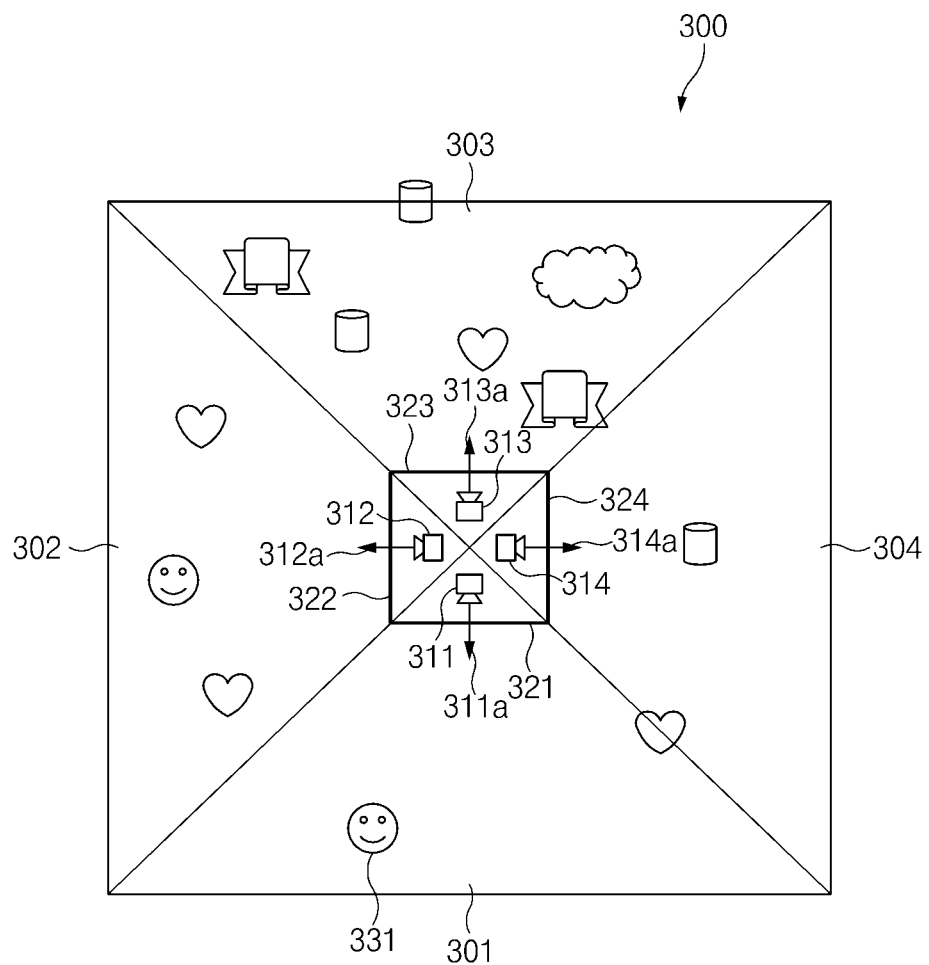
FIG. 3 is a diagram showing that four virtual cameras are arranged in a virtual three-dimensional space according to an embodiment of the disclosure.

FIG. 3 is a diagram showing that four virtual cameras are arranged in a virtual three-dimensional space 300 according to an embodiment of the disclosure. In FIG. 3, for convenience of description, the virtual three-dimensional space 300 (e.g., a 3D modeling world) compatible with a three-dimensional Cartesian coordinate system (e.g., xyz coordinate system) is illustrated in the form of a two-dimensional Cartesian coordinate system (e.g., xy coordinate system) excluding one axis (e.g. z axis). The virtual three-dimensional space 300 may include various 3D model objects (e.g., 331), and a position of at least one virtual camera is defined to be associated with a point on the virtual three-dimensional space to perform rendering at a specific time point.

In FIG. 3, the processor 113 or 123 may set a plurality of rendering regions 301, 302, 303, and 304 based on virtual cameras 311, 312, 313, and 314 corresponding to four view vectors 311a, 312a, 313a, and 314a in front, back, left, and right directions in the virtual three-dimensional space.

A method of setting the virtual camera and the rendering region is a general technology in the field of 3D graphics, and a detailed description thereof will be omitted. According to one embodiment, the processor 113 or 123 may not only locate the four virtual cameras 311, 312, 313, and 314 at positions spaced apart from a reference point (a reference point of specific x, y, and z coordinates) a predetermined distance as illustrated in FIG. 3 but also locate all the virtual cameras 311, 312, 313, and 314 at the reference point.

According to one embodiment, the processor 113 or 123 may set the rendering regions 301, 302, 303, and 304 respectively corresponding to the plurality of virtual cameras 311, 312, 313, and 314. Although not illustrated in the drawing, the sizes of rendering regions, for example, the sizes of view frustums, may be set differently.

The images of the objects 331 existing in the rendering regions 301, 302, 303, and 304 may be formed on planes 321, 322, 323, and 324 shown in front of the virtual cameras 311, 312, 313, and 314 in FIG. 3, and the images of these objects may be rendered by the processor 113 or 123.

Figure 4:
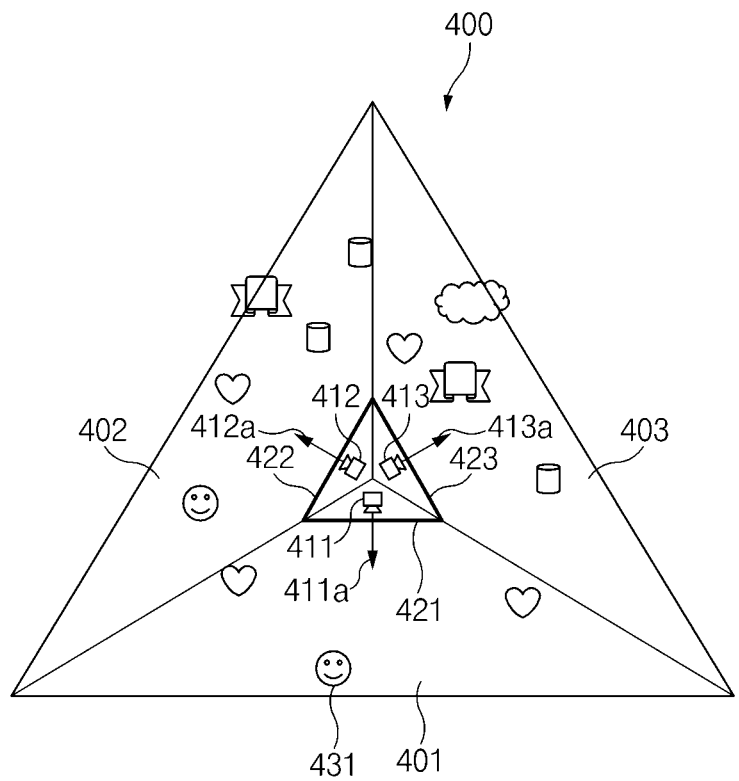
FIG. 4 is a diagram showing that three virtual cameras are arranged in a virtual three-dimensional space according to an embodiment of the disclosure.

FIG. 4 is a diagram showing that three virtual cameras are arranged in a virtual three-dimensional space according to an embodiment of the disclosure.

In FIG. 4, the processors 113 or 123 may set a plurality of rendering regions 401, 402, and 403 based on virtual cameras 411, 412, and 413 corresponding to three view vectors 411a, 412a, and 413a in three directions in a virtual three-dimensional space 400.

According to one embodiment, the processor 113 or 123 may not only locate the three virtual cameras 411, 412, and 413 at positions spaced apart from a reference point a predetermined distance as illustrated in FIG. 4, but also locate all the virtual cameras 411, 412, and 413 at the reference point.

According to one embodiment, the processor 113 or 123 may set the rendering regions 401, 402, and 403 for the plurality of virtual cameras, respectively and although not illustrated in the drawing, the sizes of the rendering regions 401, 402, and 403, that is, the sizes of view frustums may be set differently.

The images of objects 431 existing in the rendering regions 401, 402, and 403 may be formed on planes 421, 422 and 423 shown in front of the virtual cameras 411, 412, and 413 in FIG. 4 and the images of these objects 531 may be rendered by the processor 113 or 123.

Figure 5:
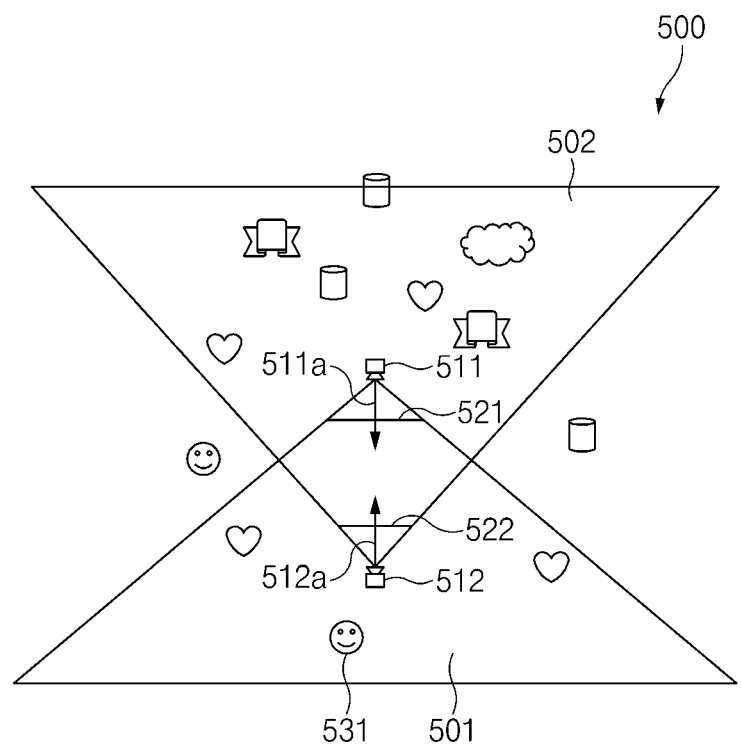
FIG. 5 is a diagram showing that two virtual cameras are arranged in a virtual three-dimensional space according to an embodiment of the disclosure.

FIG. 5 is a diagram showing that two virtual cameras are arranged in a virtual three-dimensional space according to an embodiment of the disclosure.

In FIG. 5, the processor 113 or 123 may set generate a plurality of rendering regions 501 and 502 based on virtual cameras 511 and 512 corresponding to two view vectors 511a and 512a in two directions opposite to each other in a virtual three-dimensional space 500.

According to one embodiment, the processor 113 or 123 may not only locate the two virtual cameras 511 and 512 at a reference point, but also locate them at positions spaced apart from the reference point a predetermined distance, as shown in FIG. 5. For example, the processor 113 or 123 may locate all the virtual cameras 511 and 512 at positions which are shifted by a predetermined offset in the xyz coordinate system. That is, the virtual cameras 511 and 512 may be located at different adjacent positions.

According to one embodiment, the processor 113 or 123 may set the rendering regions 501 and 502 respectively corresponding to the plurality of virtual cameras 511 and 512. Although not shown in the drawing, the sizes of the respective rendering regions 501 and 502, for example, the sizes of the respective view frustums may be set to be different from each other.

The images of the objects 531 existing in the rendering regions 501 and 502 may be formed on planes 521 and 522 shown in front of the virtual cameras in FIG. 5 and the images of these objects 531 may be rendered by the processor 113 or 123.

According to various embodiments, not only the position of the virtual camera 311, 312, 313, 314, 411, 412, 413, 511 or 512 and the direction of the view vector 311a, 312a, 313a, 314a, 411a, 412a, 413a, 511a, or 512a may be set arbitrarily (e.g., by a content creator or a content player), and but also the direction of the view vector of any one of the virtual cameras 311, 312, 313, 314, 411, 412, 413, 511, and 512 may be set to coincide with a gaze direction of a user based on gaze information of the user (e.g., the user of a content player or a 360-degree user terminal).

Figure 6A:
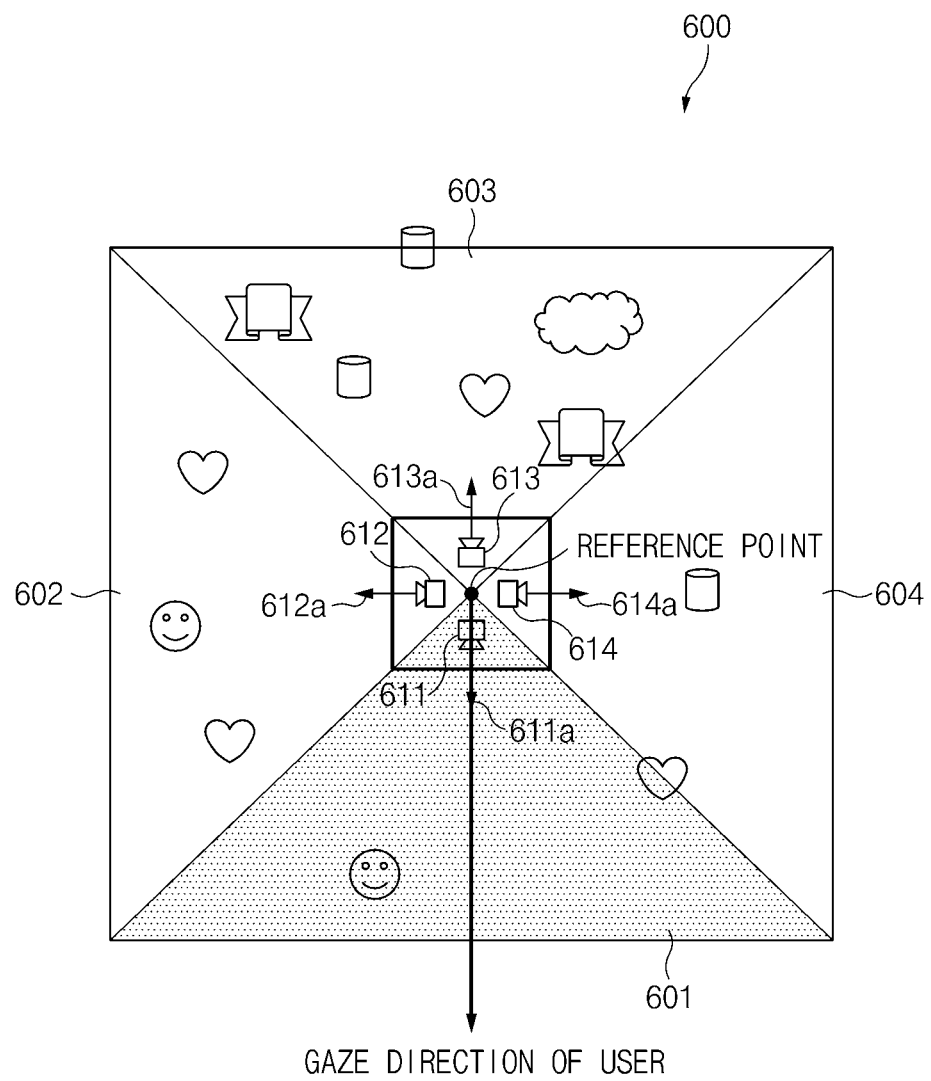
FIG. 6A is a diagram illustrating a case where a gaze direction of a user coincides with a direction of a view vector of a virtual camera in a virtual three-dimensional space, according to an embodiment of the disclosure.
Figure 6B:
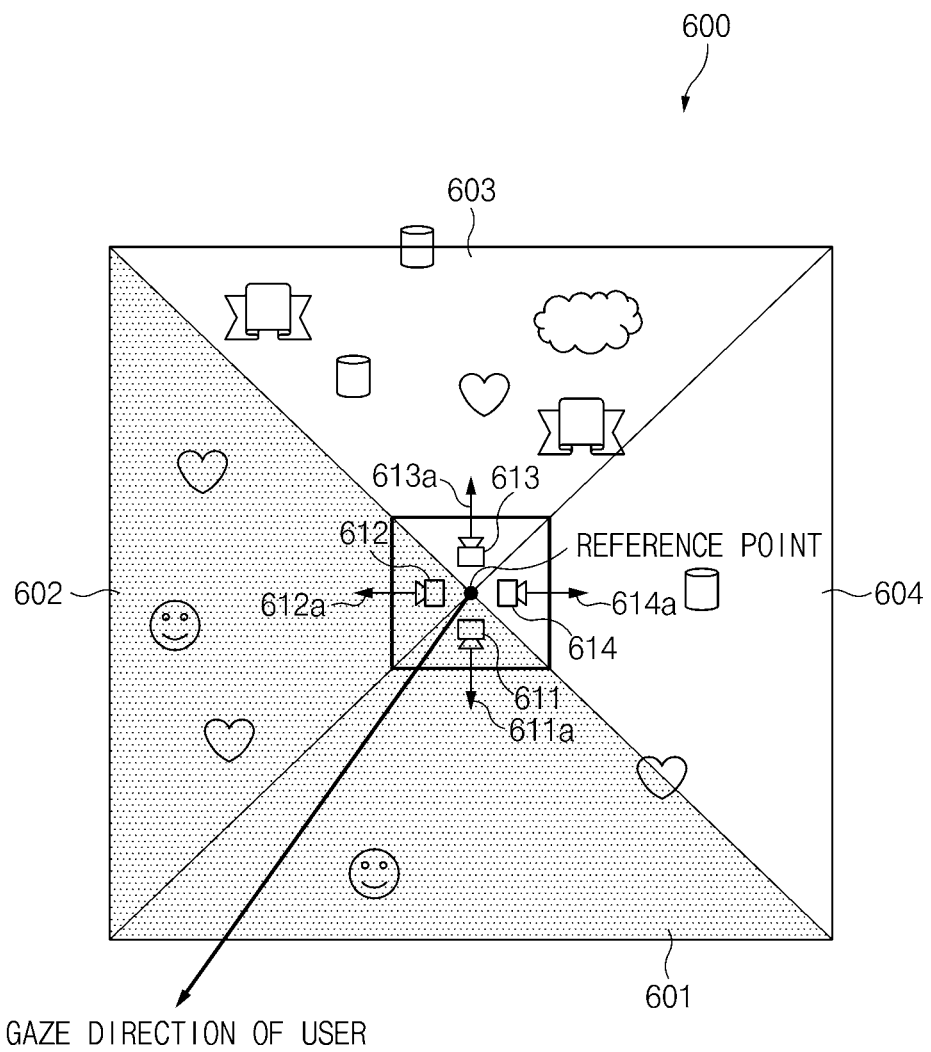
FIG. 6B is a diagram illustrating a case where a gaze direction of a user does not coincide with a direction of a view vector of a virtual camera in a virtual three-dimensional space, according to an embodiment of the disclosure.

According to various embodiments, the configuration of the plurality of cameras described with reference to FIGS. 3 to 5 may be changed according to the states of the electronic device 110 or 120 and/or the network. Referring to FIGS. 6A and 6B, according to various embodiments of the disclosure, there will be described operation in which the processor 113 or 123 selects at least one rendering region based on the gaze information of the user and renders the selected at least one rendering region with a higher quality than the remaining rendering regions. It is noted that information based on which the processors 113 and 123 selects an image is not limited to the gaze information of the user.

As described above, the processor 113 of the server 110 shown in FIG. 1 may obtain gaze information of a user through the communication circuit 112, and the processor 113 or 123 of the user terminal 120 may obtain the gaze information of the user through the sensor 121.

According to an embodiment, the processor 113 or 123 (e.g., the three-dimensional application 211 or the three-dimensional rendering module 212) may render a rendering region corresponding to the view vector, making the smallest angle with a gaze direction of the user, with a higher quality than the remaining rendering regions.

In addition, the processor 113 or 123 may render not only the rendering region corresponding to the view vector making the smallest angle with the gaze direction of the user, but also a rendering region corresponding to a view vector making the second smallest angle with the gaze direction of the user among the view vectors, with a higher quality than the remaining images.

FIG. 6A is a diagram illustrating a case where a gaze direction of a user coincides with a direction of a view vector of a virtual camera in a virtual three-dimensional space, according to an embodiment of the disclosure. FIG. 6B is a diagram illustrating a case where a gaze direction of a user does not coincide with a direction of a view vector of a virtual camera in a virtual three-dimensional space, according to an embodiment of the disclosure.

Referring to FIG. 6A, the processor 113 or 123 may associate the gaze direction of the user included in the gaze information of the user with one of a plurality of view vectors.

In FIG. 6A, the gaze direction of the user may coincide with a direction of a first view vector 611a of a virtual camera 611. Accordingly, the view vector making the smallest angle with the gaze direction of the user among the plurality of view vectors may be the first view vector 611a of the virtual camera 611. The processor 113 or 123 may select the virtual camera 611 corresponding to the first view vector 611a and render the rendering region of the selected virtual camera 611 with a higher quality than the rendering regions of the virtual cameras 612, 613, and 614 corresponding to the view vectors 612a, 613a, and 614a. That is, the processor 113 or 123 may render the rendering region 601 corresponding to the selected virtual camera 611 with a higher quality than the rendering regions 602, 603, and 604 of the remaining virtual cameras.

In another embodiment, a direction of a view vector of any one of the plurality of virtual cameras 611, 612, 613, and 614 may be set to coincide with a gaze direction of the user based on the gaze information of the user as described above. In this case, since the gaze direction of the user always coincides with the direction of the view vector of any one of the virtual cameras, the rendering region of the virtual camera corresponding to the view vector coincident with the gaze direction of the user may be rendered with a higher quality than the rendering regions of the virtual cameras corresponding to other view vectors.

In FIG. 6B, the gaze direction of the user may be between a direction of the view vector 611a of the virtual camera 611 and a direction of the view vector 612a of the virtual camera 612.

When the processor 113 or 123 selects a virtual camera corresponding to the view vector making the smallest angle with the gaze direction of the user among the view vectors, an angle between the gaze direction of the user and the direction of the view vector 611a of the virtual camera 611 is smaller and therefore, the processor 113 or 123 may select the virtual camera 611 corresponding to the view vector 611a and render the rendering region of the selected virtual camera 611 with a higher quality than those of the rendering regions of the virtual cameras 612, 613 and 614 corresponding to the view vectors 612a, 613a and 614a directed in other directions.

However, in the example of FIG. 6B, the image of the virtual camera 612 corresponding to the view vector 612a may enter the user's field of view. Thus, according to the embodiment, the processor 113 or 123 may select the virtual camera 611 corresponding to the view vector 611a making the smallest angle with the gaze direction of the user among the view vectors 611a, 612a, 613a and 614a, and the virtual camera 612 corresponding to the view vector 612a making the second smallest angle with the gaze direction of the user among view vectors, and render the rendering regions of the selected virtual camera 611 and 612 with a higher quality than rendering regions of the virtual cameras corresponding to the view vectors 613a and 614a directed in other directions.

Although it is described that at least one rendering region is selected based on the gaze information of the user in the examples of FIGS. 6A and 6B, according to various embodiments, the processor 113 or 123 may select at least one rendering region to be rendered with a higher quality than the remaining rendering regions based on virtual gaze information (e.g., gaze information of a 3D character) in a virtual space, a moving direction of a reference point of a plurality of virtual cameras or a value previously set in the three-dimensional application 211 or 223 (e.g., a value set to correspond to a time or virtual position upon creating of content).

For example, the processor 113 or 123 may select a rendering region corresponding to the view vector making the smallest angle with the moving direction of the reference point among the view vectors 611a, 612a, 613a, and 614a. In addition, the processor 113 or 123 may select a rendering region corresponding to the view vector making the smallest angle with the moving direction of the reference point among the view vectors 611a, 612a, 613a, and 614a, and a rendering region corresponding to the view vector making the second smallest angle with the moving direction of the reference point among the view vectors.

Further, the processor 113 or 123 may select the rendering region based on the virtual gaze information in the virtual space similarly to select the rendering region to be rendered with a high quality based on the gaze information of the user.

The processor 113 or 123 may also select an image based on at least two or more of the gaze information of the user, the virtual gaze information in the virtual space, the moving direction of the reference point, and a value preset in the three-dimensional application.

Hereinafter, referring to FIG. 7, there will be described operation in which the processor 113 or 123 selects at least one rendering region based on selection input information for an object, selects at least one rendering region based on sound of a video, and renders the selected at least one rendering region with a higher quality than the remaining rendering regions according to various embodiments of the disclosure.

According to an embodiment, the processor 113 or 123 of the server illustrated in FIG. 1 may obtain selection input information for an object 721 (or a specific position and/or time) in a virtual three-dimensional space. For example, the processor 113 or 123 may obtain input information for an object or specific location and/or time selected by a content creator, and obtain input information for an object or a specific location selected by a user through the user input circuit 122 of the user terminal 120.

In addition, the three-dimensional space may include sound (e.g., a 3D object 731 with a specific sound).

In one embodiment, the processor 113 or 123 may render a rendering region of at least one virtual camera, which includes a selectively input object, among the rendering regions of the plurality of virtual cameras with a higher quality than the rendering regions of the remaining virtual cameras. Further, in one embodiment, the processor 113 or 123 may render a rendering region of at least one virtual camera, which includes sound (e.g., object or location), among the plurality of virtual cameras with a higher quality than the rendering regions of the remaining virtual cameras.

Figure 7:
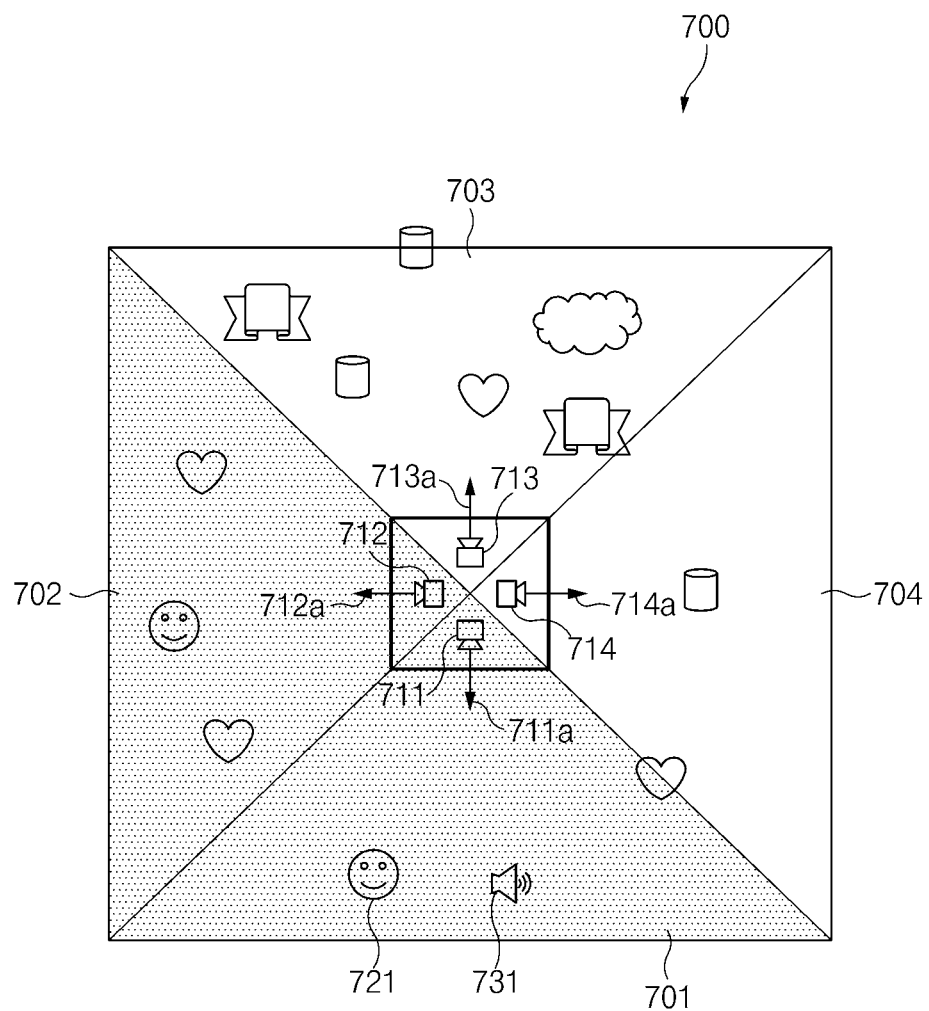
FIG. 7 is a diagram showing a point where a sound is generated in a virtual three-dimensional space and an object selectively input from a user in a virtual three-dimensional space according to an embodiment of the disclosure.

FIG. 7 is a diagram illustrating an object selected from a user in a virtual three-dimensional space and a point where a sound is generated in a virtual three-dimensional space according to an embodiment of the disclosure.

Referring to FIG. 7, the object 721 selectively input from the user may be contained in the rendering region of a virtual camera 711 corresponding to a view vector 711*a*. The processor 113 or 123 may select a rendering region containing the selectively-input object 721 and render it with a higher quality than the rendering regions corresponding to view vectors 712*a*, 713*a*, and 714*a* directed in other directions. That is, the processor 113 or 123 may render a rendering region 701 corresponding to a selected image with a higher quality than remaining rendering regions 702, 703, and 704.

Referring to FIG. 7, an object with sound 731 may be contained in a rendering region of the virtual camera 711 corresponding to the view vector 711*a*. The processor 113 or 123 may select a rendering region containing the object with sound 731 and render it with a higher quality than the rendering regions corresponding to the view vectors 712*a*, 713*a*, and 714*a* directed in other directions.

Hereinafter, referring to FIGS. 8A and 8B, there will be described an operation in which the processor 113 or 123 selects at least one rendering region based on a moving direction of a reference point of a plurality of view vectors in a virtual three-dimensional space, and renders the selected at least one rendering region with a higher quality than the remaining rendering regions, that is an operation of adjusting a size of a view frustum, according to various embodiments of the disclosure. It is noted that information based on which the processor 113 or 123 selects a rendering region is not limited to the moving direction of the reference point.

The reference point of the plurality of view vectors may be moved in a virtual three-dimensional space 800. That is, the movement of the reference point of the plurality of view vectors means that a plurality of virtual cameras 811, 812, 813, and 814 move together in the virtual three-dimensional space 800.

The processor 113 or 123 may select a rendering region corresponding to a view vector corresponding to the moving direction of the reference point on the virtual three-dimensional space 800 among a plurality of images, and render the selected rendering region with a higher quality than rendering regions corresponding to the remaining view vectors.

Figure 8A:
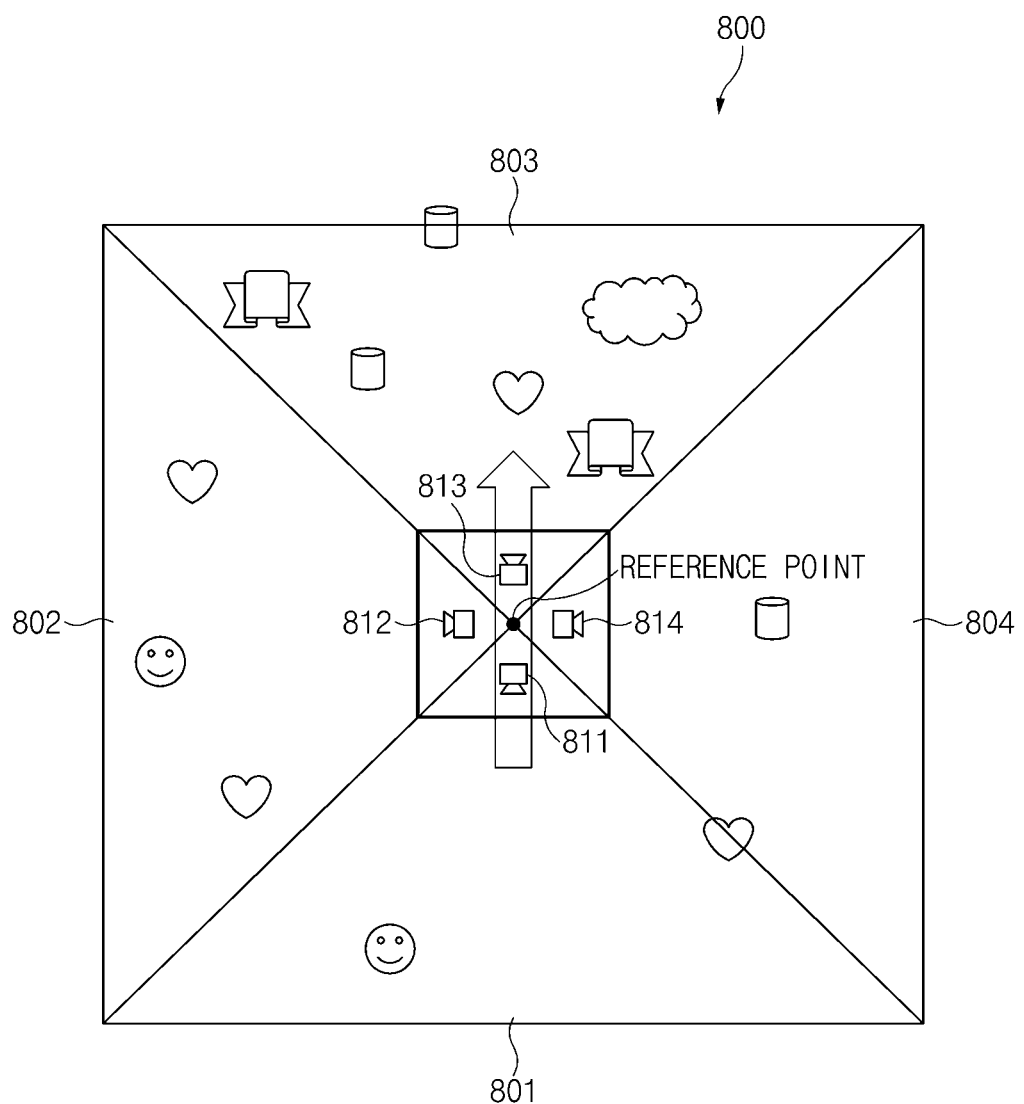
FIG. 8A is a diagram illustrating a moving direction of a virtual camera in a virtual three-dimensional space according to an embodiment of the disclosure.

FIG. 8A is a view showing a moving direction of a virtual camera in a virtual three-dimensional space according to an embodiment of the disclosure.

Figure 8B:
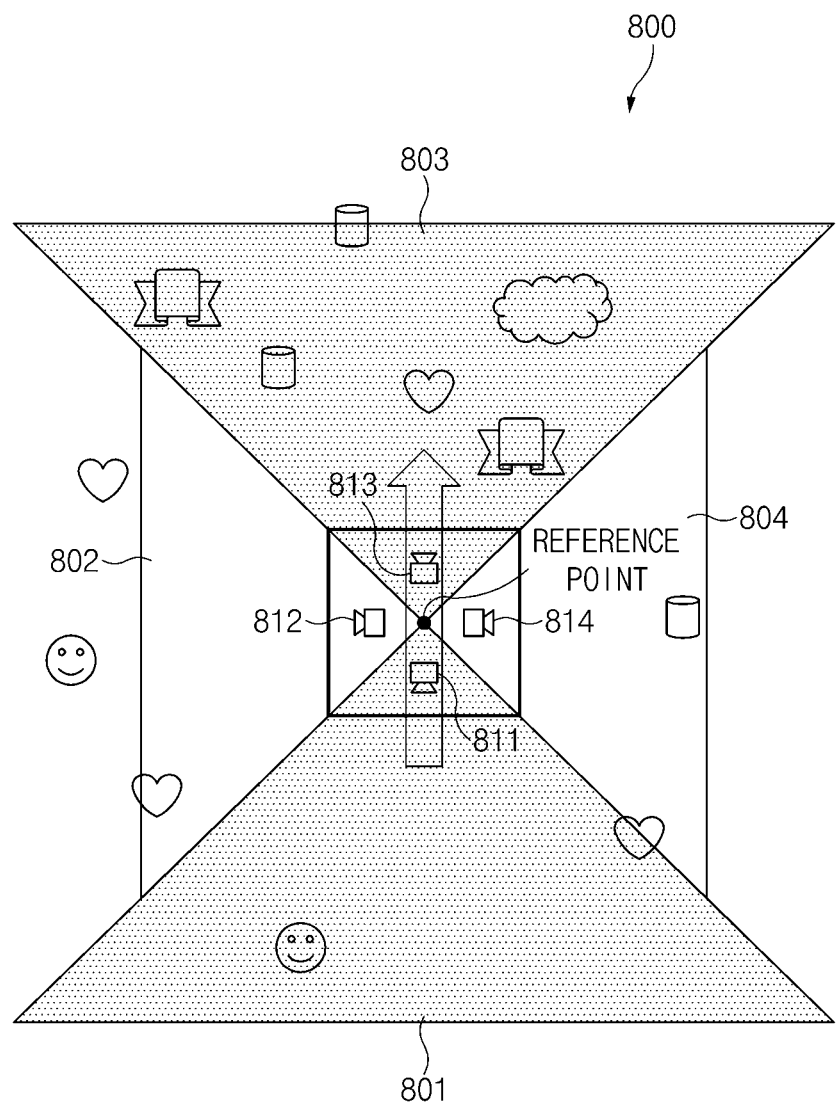
FIG. 8B is a view showing that the size of a view frustum is adjusted based on the moving direction of the virtual camera in the virtual three-dimensional space according to an embodiment of the disclosure.

FIG. 8B is a view showing that the size of a view frustum is adjusted based on the moving direction of the virtual camera in the virtual three-dimensional space according to the embodiment of the disclosure.

Referring to FIG. 8A, a reference point of the plurality of view vectors may move in the direction of the view vector of the front-facing virtual camera 813. The reference point of the view vector may correspond to, for example, the position of a character disposed in the virtual three-dimensional space. In the disclosure, the character may mean a character controlled by the user (e.g., the hero of a game). The processor 113 or 123 may select a rendering region corresponding to the view vector of the front-facing virtual camera 813 which corresponds to the direction in which the reference point of the plurality of view vectors move and a rendering region corresponding to the view vector of the rear-facing virtual camera 811 and render the selected rendering regions with a higher quality than the rendering regions corresponding to the view vectors directed in the other directions. That is, the processor 113 or 123 may render the selected rendering regions 801 and 803 with a higher quality than the remaining rendering regions 802 and 804.

As illustrated in FIG. 8B, the processor 113 or 123 may perform setting such that the sizes of the view frustums of the rendering regions 801 and 803 corresponding to the front virtual camera 813 and the rear virtual camera 811 are greater than the sizes of the view frustums of the remaining rendering regions 802 and 804. When the size of the view frustum is large, an object farther from the virtual camera may be contained in the rendering region, and therefore, a rendering region having a large view frustum may be rendered with a higher quality than a rendering region having a small view frustum. In various embodiments, the processor 113 or 123 may adjust a size of a rendering region in a manner to adjust the distance of a near plane of the view frustum.

However, it is only an example that the rendering region corresponding to the moving direction of the reference point of the view vector is set as a rendering region corresponding to the view vector coinciding with the moving direction, and the processor 113 or 123 may render the rendering regions 802 and 804 of the left virtual camera 812 and the right virtual camera 814 with a higher quality than the rendering regions of the front virtual camera 813 and the rear virtual camera 811.

Although the processor 113 or 123 selects the rendering region based on the moving direction of the reference point in the examples of FIGS. 8A and 8B, the processor 113 or 123 may select the rendering region based on the gaze information of the user, the virtual gaze information in the virtual space, a value preset in the 360 degree content, or the like.

The processor 113 or 123 may also select a rendering region based on at least two or more of the gaze information of the user, the virtual gaze information in the virtual space, the moving direction of the reference point, and a value preset in the 360-degree content.

In the description with reference to FIGS. 6A to 8B, an example has been described in which rendering regions of one or two cameras among a plurality of cameras are rendered with a higher quality than rendering regions of the remaining cameras. According to one embodiment, the embodiments described above may be combined to set the rendering quality.

In one embodiment, the processor may determine the rendering quality based on both the gaze information of the user and the moving direction of the reference point. For example, when the gaze direction of the user corresponds to a first view vector and the gaze direction of the reference point corresponds to a second view vector that is different from the direction of the first view vector, the rendering region of a virtual camera corresponding to the first direction and the rendering region of a virtual camera corresponding to the second direction both may be rendered with a higher quality than the rendering regions of the other virtual cameras.

In one embodiment, the processor may set the rendering regions of all the virtual cameras to high quality, and allow the rendering regions that are set to high quality to be ranked.

In addition to the various embodiments described above, there is described a method, by a processor, for allowing rendering qualities of rendering regions corresponding to virtual cameras to be ranked.

According to one embodiment, the quality of at least one rendering region of the plurality of rendering regions may be predefined. For example, the rendering quality of a rendering region corresponding to a view vector parallel to an xy plane of the virtual three-dimensional space such as front, back, left, and right may be set to high quality, and the rendering quality of the rendering region corresponding to the view vector perpendicular to the xy plane of the virtual three-dimensional space such as up or down may be set to low quality. (According to the 3D content program, the three-dimensional space may express coordinates corresponding to the front, rear, left and right by the xz plane, and coordinates corresponding to up and down by the y axis. In various embodiments of the disclosure, a particular axis is not limited to a specific orientation.)

According to one embodiment, the processor 113 or 123 may render the rendering quality of at least one of the rendering regions corresponding to the plurality of virtual cameras with a high quality or low quality at a specified time or when a virtual camera is at a predetermined position in the virtual three-dimensional space.

Various examples in which the processor 113 or 123 allows rendering qualities of rendering regions respectively corresponding to virtual cameras to be ranked will be described below.

According to one embodiment, the processor 113 or 123 may set a region that is not rendered among a plurality of rendering regions. For example, the processor 113 or 123 may set a rendering region corresponding to a view in the up or down direction so as not to be rendered. According to various embodiments, the processor 113 or 123 may replace a non-rendered region with a specific color, image, or previously-rendered image.

According to one embodiment, the processor 113 or 123 may not render some scenes during runtime. For example, the processor may not render a rendering region based on a performance status of the electronic devices 110, 120 or 210 (available CPU/GPU capability, heat generation, amount of computation, remaining battery level, predetermined settings of a 3D content program), a network communication state (e.g., bandwidth), a state of the user terminal or the like. For example, a rendering region corresponding to one of images in front, rear, left, right, up and down directions may not be rendered.

For example, the processor 113 or 123 may not render the rendering region of a virtual camera in the rear direction of a region of interest of the user terminal. According to various embodiments, a non-rendered image may be replaced with a specific color, image, or previously rendered image in synthesizing the plurality of rendered images.

According to one embodiment, the processor 113 or 123 may adjust the number and positions of virtual cameras based on the state of the server 110, the state of communication between the server 110 and the user terminal 120, or the state of the user terminal 120 during runtime (that is, execution of the 3D content program). For example, the processor 113 or 123 may make a change so as to perform rendering with four virtual cameras as shown in FIG. 3 and then perform rendering with the three cameras as shown in FIG. 4. That is, the processor 113 or 123 may change region settings of each virtual camera (for example, view frustum settings).

In various embodiments, the processor 113 or 123 may adjust the number and positions of the virtual cameras according to the performance status of the electronic device and/or the network communication state. In various embodiments, information on a change in settings (e.g., a change in the number of virtual cameras or a view frustum) may be transmitted to the user terminal 120.

According to one embodiment, a plurality of light sources may be disposed in the virtual three-dimensional space. When rendering a rendering region, the processor 113 or 123 may calculate a degree of reflection of each light source on the surface of an object and therefore, computational complexity may increase as the number of the light sources increases.

Therefore, the processor 113 or 123 may make an adjustment to decrease the number of light sources applied to a rendering region to be rendered with low quality. For example, the processor 113 or 123 may apply an ambient light, which is a basic light among a plurality of light sources set in the virtual three-dimensional space, and may not apply some point lights or specular lights. According to various embodiments, the processor 113 or 123 may not apply point lights or specular lights away from a virtual camera in an image to be rendered with low quality.

According to one embodiment, the processor 113 or 123 may apply a shading technique and change a shading technique algorithm to be applied when performing rendering.

In the virtual three-dimensional space, the processor 113 or 123 may use various shading techniques to apply interpolation to the light reflection effect. For example, the processor 113 or 123 may apply shading techniques such as Flat shading, Gouraud shading, and Phong shading. The amount of computation required for the processors 113 and 123 to apply the shading technique may be large in the order of Phong shading technique, Gouraud shading technique, and Flat shading technique.

According to one embodiment, the processor 113 or 123 may apply a shading technique (algorithm) different from that for an image set to high-quality rendering when rendering an image of a virtual camera which is set to low-quality rendering. For example, Flat shading technique may be applied to a rendering region set to low-quality rendering, and Phong shading technique may be applied to a rendering region set to high-quality rendering.

According to one embodiment, the shading technique may be set for each object in the virtual three-dimensional space. When an object belongs to a rendering region set to low-quality rendering although the object is set to Phong shading technique, Gouraud shading technique may be applied.

According to one embodiment, when the processor 113 or 123 performs rendering, three-dimensional objects may be rasterized to a pixel buffer having a predetermined resolution (e.g., HD resolution). According to various embodiments, a rendering region set to low-quality rendering may have a rendering pixel buffer of a smaller resolution than that of an image set to high-quality rendering.

According to one embodiment, the processor 113 or 123 may map a two-dimensional texture image onto a three-dimensional object. For example, a texture image may be stored at various resolutions by a mipmapping scheme.

According to various embodiments, the processor 113 or 123 may use the mipmapping scheme of a texture (s) in a high-quality rendering region and may not use the mipmapping scheme of the texture in a low-quality rendering region. Alternatively, the processor 113 or 123 may use the mipmapping scheme of the texture (s) in the low-quality rendering region and may not use the mipmapping scheme of the texture in the high-quality rendering region.

According to another embodiment, the processor 113 or 123 may use a texture with a lower resolution when rendering a low-quality rendering region among a plurality of images. For example, the electronic device may separately have a high resolution texture and a low resolution texture for at least some of 3D objects. The processor 113 or 123 may perform texturing on at least some 3D objects by loading low-resolution textures when rendering a low-quality rendering region, among a plurality of images.

According to various embodiments, the processor 113 or 123 may differently set degrees of the detail of 3D object models (the level of detail or the number of vertexes of modeling data) contained in a rendering region set to low-quality rendering and a rendering region set to high-quality rendering. For example, the same 3D object model may have different numbers of vertexes when rendered in a rendering region set to high-quality rendering and in a rendering region set to low-quality rendering. As another example, a LOD (level of detail) setting value of a virtual camera set to high-quality rendering (i.e., a reduced value in complexity of pieces of modeling data depending on a distance away from the camera) and a LOD setting value of a virtual camera set to low-quality rendering may be different.

Figure 9:
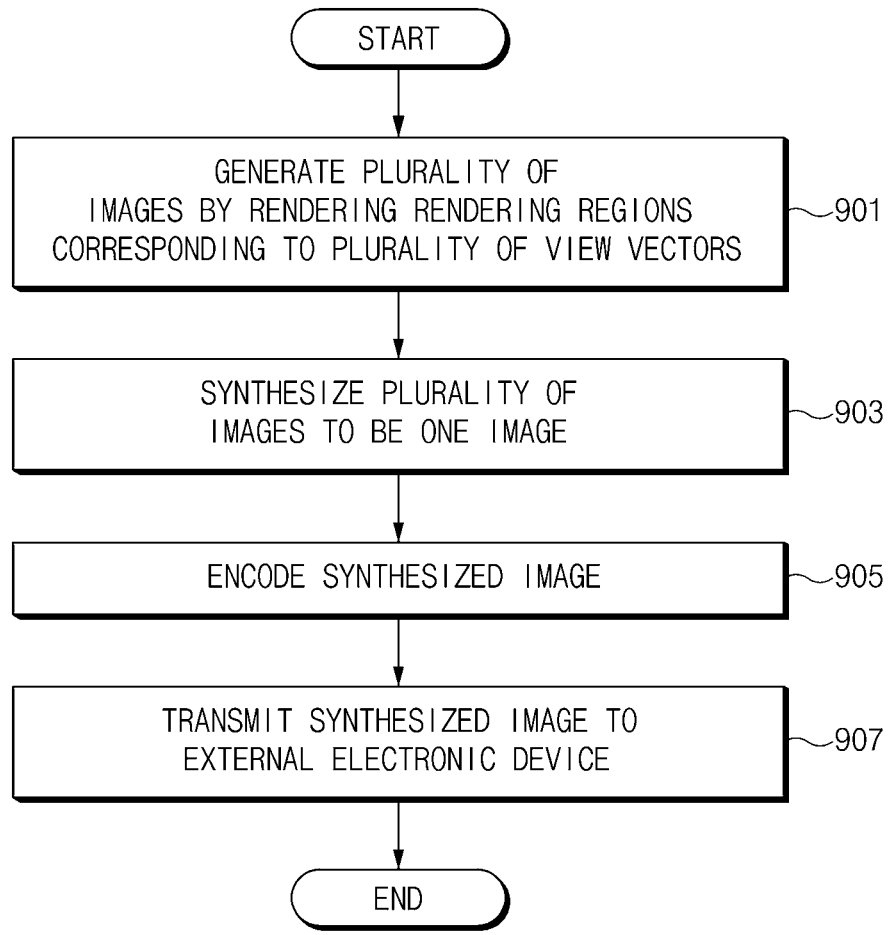
FIG. 9 is a flowchart of a method for synthesizing images and transmitting a synthesized image to a user terminal in a server according to an embodiment of the disclosure.

FIG. 9 is a flowchart of a method for synthesizing images and transmitting a synthesized image to an external electronic device in an electronic device according to an embodiment of the disclosure.

Referring to FIG. 9, the method for synthesizing images and transmitting a synthesized image to an external electronic device (the user terminal 120) in the electronic device (the server 110) according to an embodiment of the disclosure may include generating a plurality of images by rendering rendering regions corresponding to a plurality of view vectors (901), synthesizing the plurality of images to be one image (903), encoding the synthesized image (905), and transmitting the synthesized image to the external electronic device (907).

In operation 901, the processor 113 of the electronic device may render rendering regions corresponding to the plurality of view vectors to generate a plurality of images. In one embodiment, the processor 113 may set locations of a plurality of virtual cameras and the locations and the number of view vectors corresponding to each of the virtual cameras. As described above, the processor 113 may perform rendering such that the plurality of rendering regions corresponding to the plurality of view vectors have different rendering qualities based on the gaze information of the user, the virtual gaze information in the virtual space, the moving direction of the reference point, the selection input information, or a value preset in content or the like.

In operation 903, the processor 113 of the electronic device may synthesize a plurality of images including at least one rendered image. The processor 113 may stitch the plurality of images generated to synthesize them to be one image, and the synthesized image may be a 360-degree image.

In operation 905, the processor 113 of the electronic device may encode the synthesized image. The processor may encode the synthesized image using formats such as MP4-H.264, H.265, jpeg, HDMI, and DP (Displayport) format, or the like. In various embodiments, operation 905 may be omitted.

In operation 907, the processor 113 of the electronic device may transmit the synthesized image to another electronic device (e.g., the user terminal 120 or a content server) via the communication circuit 112. As another embodiment, in operation 907, the processor 113 of the electronic device may store the synthesized image (e.g., 360 degree content) in a memory.

Figure 10:
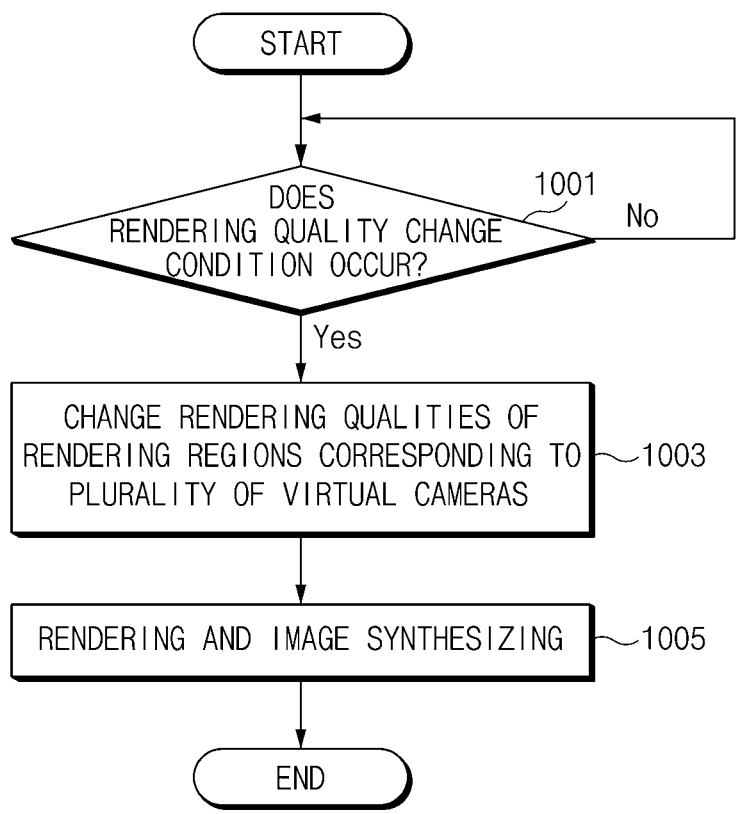
FIG. 10 is a flowchart of a method for changing a rendering quality of a rendering region and synthesizing images in an electronic device according to an embodiment of the disclosure.

FIG. 10 is a flowchart of a method for changing a rendering quality of a rendering region and synthesizing images in an electronic device according to an embodiment of the disclosure.

Referring to FIG. 10, when a rendering quality change condition occurs, operations 1001 and 1003 for changing the rendering qualities of rendering regions corresponding to a plurality of virtual cameras, and an operation 1005 for rendering the rendering regions and synthesizing images.

In operation 1001, the processor 113 may determine whether a condition for changing a rendering quality occurs. For example, when there occurs a change in the gaze information of the user, a change in the state of the electronic device, a change in the moving direction of the reference point on the virtual three-dimensional space, or a change in the camera settings of the content, the processor 113 may determine that the condition for changing the rendering quality has occurred.

In operation 1003, when the condition for changing the rendering quality occurs, the processor 113 may change the rendering qualities of the rendering regions corresponding to the plurality of virtual cameras based on the condition. For example, when the gaze direction of the user that has faced the front, faces the rear, the processor 113 may decrease the rendering quality of the rendering region corresponding to the front and increase the rendering quality of the rendering region behind.

In operation 1005, the processor 113 may render the plurality of rendering regions with the changed qualities and synthesize the rendered images to be one image. The processor 113 may render the rendering regions corresponding to the plurality of virtual cameras with the changed qualities and synthesize the rendered images using a stitching technique or the like.

Figure 11:
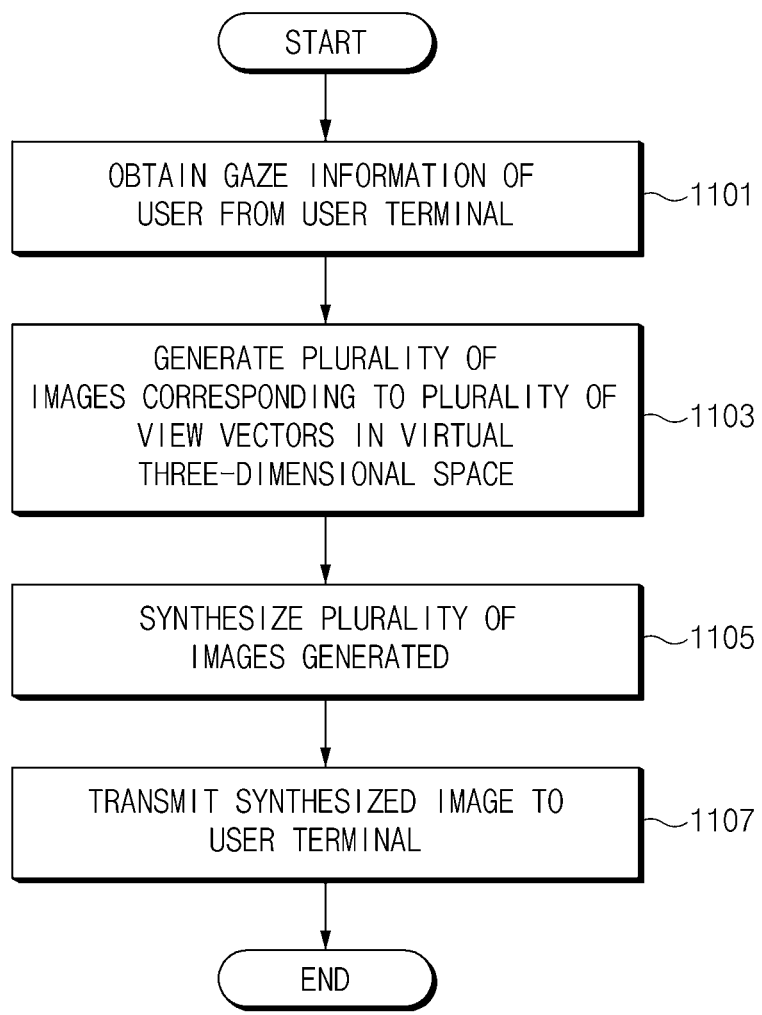
FIG. 11 is a flowchart of a method for generating an image based on gaze information of a user and transmitting the image to a user terminal in a server according to an embodiment of the disclosure.

FIG. 11 is a flowchart of a method for generating an image based on gaze information of a user and transmitting the image to a user terminal in a server according to an embodiment of the disclosure.

Referring to FIG. 11, the method of generating an image based on gaze information of a user and transmitting the image to the user terminal 120 in the server 110 according to an exemplary embodiment of the disclosure may include obtaining the gaze information of the user from the user terminal 120 (1101), generating a plurality of images corresponding to a plurality of view vectors in a virtual three-dimensional space (1103), synthesizing the generated plurality of images (1105), and transmitting the synthesized image to the user terminal 120 (1107).

In operation 1101, the communication circuit 112 of the server 110 may obtain the gaze information of the user from the user terminal 120. The communication circuit 112 may obtain sensing information for generating the gaze information from the user terminal 120 and the processor 113 of the server 110 may generate the gaze information based on the sensing information.

In operation 1103, the processor 113 of the server 110 may generate the plurality of images corresponding to the plurality of view vectors in the virtual three-dimensional space. As described above, the processor 113 may set rendering regions corresponding to the plurality of view vectors in the virtual three-dimensional space, and render the rendering regions. The processor 113 may set the rendering qualities of the rendering regions differently as in the above-described examples, of which the detailed description have been given above and is thus omitted.

In operation 1105, the processor 113 of the server 110 may synthesize the generated plurality of images. The processor 113 may stitch the plurality of images generated to synthesize them to be one image, and the synthesized image may be a 360-degree image.

In operation 1107, the processor 113 of the server 110 may transmit the synthesized image to the user terminal 120 via the communication circuit 112.

Figure 12:
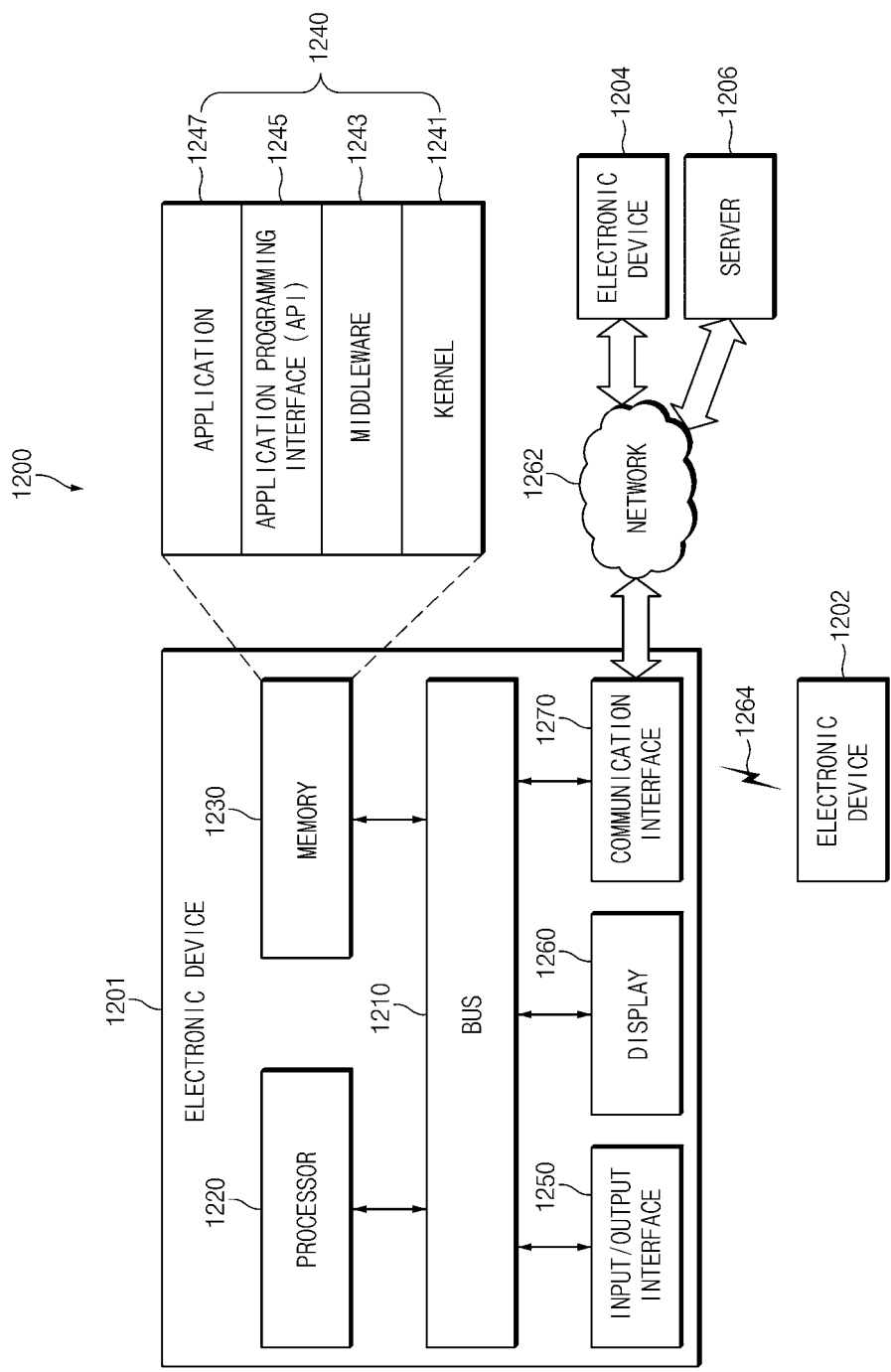
FIG. 12 illustrates an electronic device in a network environment, according to various embodiments.

FIG. 12 is a diagram illustrating an electronic device in a network environment, according to various embodiments.

Referring to FIG. 12, there is illustrated an electronic device 1201 in a network environment 1200 according to various embodiments. The electronic device 1201 may include a bus 1210, a processor 1220, a memory 1230, an input/output (I/O) interface 1250, a display 1260, and a communication interface 1270. According to an embodiment, the electronic device 1201 may not include at least one of the above-described elements or may further include other element(s).

For example, the bus 1210 may interconnect the above-described elements 1220 to 1270 and may include a circuit for conveying communications (e.g., a control message and/or data) among the above-described elements.

The processor 1220 (e.g., the processor 110 of FIG. 1) may include one or more of a central processing unit (CPU), an application processor (AP), or a communication processor (CP). The processor 1220 may perform, for example, data processing or an operation associated with control and/or communication of at least one other element(s) of the electronic device 1201.

The memory 1230 (e.g., the memory 160 of FIG. 1) may include a volatile and/or nonvolatile memory. For example, the memory 1230 may store instructions or data associated with at least one other element(s) of the electronic device 1201. According to an embodiment, the memory 1230 may store software and/or a program 1240. The program 1240 may include, for example, a kernel 1241, a middleware 1243, an application programming interface (API) 1245, and/or an application program (or "application") 1247. At least a part of the kernel 1241, the middleware 1243, or the API 1245 may be called an "operating system (OS)".

The kernel 1241 may control or manage system resources (e.g., the bus 1210, the processor 1220, the memory 1230, and the like) that are used to execute operations or functions of other programs (e.g., the middleware 1243, the API 1245, and the application program 1247). Furthermore, the kernel 1241 may provide an interface that allows the middleware 1243, the API 1245, or the application program 1247 to access discrete elements of the electronic device 1201 so as to control or manage system resources.

The middleware 1243 may perform a mediation role such that the API 1245 or the application program 1247 communicates with the kernel 1241 to exchange data.

Furthermore, the middleware 1243 may process one or more task requests received from the application program 1247 according to a priority. For example, the middleware 1243 may assign the priority, which makes it possible to use a system resource (e.g., the bus 1210, the processor 1220, the memory 1230, or the like) of the electronic device 1201, to at least one of the application program 1247. For example, the middleware 1243 may process the one or more task requests according to the priority assigned to the at least one, which makes it possible to perform scheduling or load balancing on the one or more task requests.

The API 1245 may be an interface through which the application 1247 controls a function provided by the kernel 1241 or the middleware 1243, and may include, for example, at least one interface or function (e.g., an instruction) for a file control, a window control, image processing, a character control, or the like.

The I/O interface 1250 may transmit an instruction or data, input from a user or another external device, to other element(s) of the electronic device 1201. Furthermore, the I/O interface 1250 may output an instruction or data, received from other element(s) of the electronic device 1201, to a user or another external device.

The display 1260 may include, for example, a liquid crystal display (LCD), a light-emitting diode (LED) display, an organic LED (OLED) display, or a microelectromechanical systems (MEMS) display, or an electronic paper display. The display 1260 may display, for example, various kinds of content (e.g., a text, an image, a video, an icon, a symbol, and the like) to a user. The display 1260 may include a touch screen and may receive, for example, a touch, gesture, proximity, or hovering input using an electronic pen or a portion of a user's body.

The communication interface 1270 may establish communication between the electronic device 1201 and an external device (e.g., a first external electronic device 1202, a second external electronic device 1204, or a server 1206). For example, the communication interface 1270 may be connected to a network 1262 through wireless communication or wired communication to communicate with an external device (e.g., the second external electronic device 1204 or the server 1206).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1264. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1201 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1262 may include at least one of telecommunications networks, for example, a computer network (e.g., local area network (LAN) or wide area network (WAN)), the Internet, or a telephone network.

The types of the first external electronic device 1202 and the second external electronic device 1204 may be the same as or different from the type of the electronic device 1201. According to an embodiment of the present disclosure, the server 1206 may include a group of one or more servers. A portion or all of operations performed in the electronic device 1201 may be performed in one or more other electronic devices (e.g., the first electronic device 1202, the second external electronic device 1204, or the server 1206). When the electronic device 1201 should perform a certain function or service automatically or in response to a request, the electronic device 1201 may request at least a portion of functions related to the function or service from another device (e.g., the first electronic device 1202, the second external electronic device 1204, or the server 1206) instead of or in addition to performing the function or service for itself. The other electronic device (e.g., the first electronic device 1202, the second external electronic device 1204, or the server 1206) may perform the requested function or additional function, and may transfer a result of the performance to the electronic device 1201. The electronic device 1201 may use a received result itself or additionally process the received result to provide the requested function or service. To this end, for example, a cloud computing technology, a distributed computing technology, or a client-server computing technology may be used.

Figure 13:
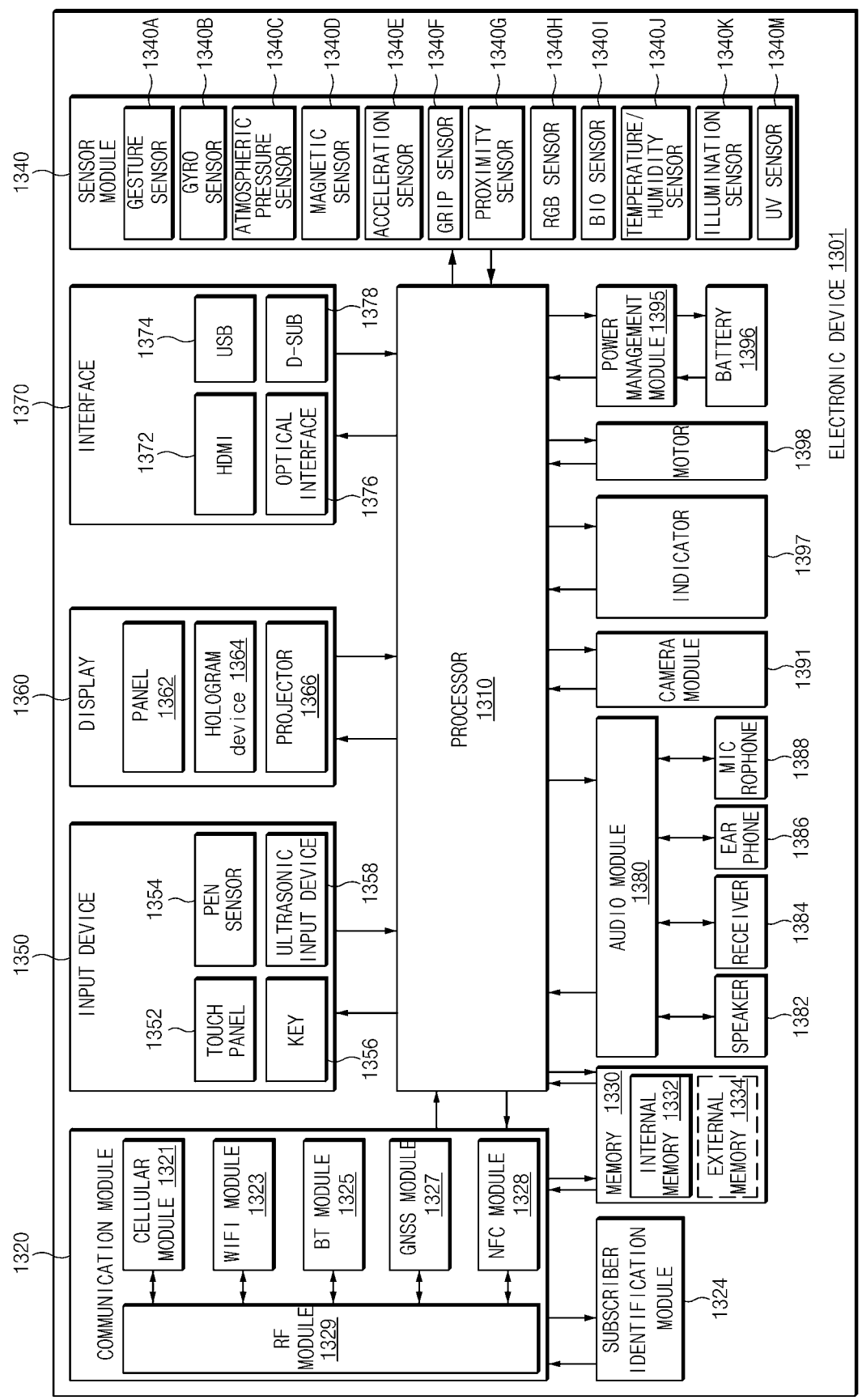
FIG. 13 illustrates a block diagram of an electronic device according to various embodiments.

FIG. 13 is a block diagram illustrating an electronic device according to an embodiment of the present disclosure.

Referring to FIG. 13, an electronic device 1301 may include, for example, a part or the entirety of the electronic device 1201 illustrated in FIG. 12. The electronic device 1301 may include at least one processor (e.g., AP) 1310, a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may run an operating system or an application program so as to control a plurality of hardware or software elements connected to the processor 1310, and may process various data and perform operations. The processor 1310 may be implemented with, for example, a system on chip (SoC). According to an embodiment of the present disclosure, the processor 1310 may further include a graphic processing unit (GPU) and/or an image signal processor. The processor 1310 may include at least a portion (e.g., a cellular module 1321) of the elements illustrated in FIG. 13. The processor 1310 may load, on a volatile memory, an instruction or data received from at least one of other elements (e.g., a nonvolatile memory) to process the instruction or data, and may store various data in a nonvolatile memory.

The communication module 1320 may have a configuration that is the same as or similar to that of the communication interface 1270 of FIG. 12. The communication module 1320 may include, for example, a cellular module 1321, a Wi-Fi module 1322, a Bluetooth (BT) module 1323, a GNSS module 1324 (e.g., a GPS module, a GLONASS module, a BeiDou module, or a Galileo module), a NFC module 1325, a MST module 1326 and a radio frequency (RF) module 1327.

The cellular module 1321 may provide, for example, a voice call service, a video call service, a text message service, or an Internet service through a communication network. The cellular module 1321 may identify and authenticate the electronic device 1301 in the communication network using the subscriber identification module 1329 (e.g., a SIM card). The cellular module 1321 may perform at least a part of functions that may be provided by the processor 1310. The cellular module 1321 may include a communication processor (CP).

Each of the Wi-Fi module 1322, the Bluetooth module 1323, the GNSS module 1324 and the NFC module 1325 may include, for example, a processor for processing data transmitted/received through the modules. According to some various embodiments of the present disclosure, at least a part (e.g., two or more) of the cellular module 1321, the Wi-Fi module 1322, the Bluetooth module 1323, the GNSS module 1324, the NFC module 1325 and the MST module 1326 may be included in a single integrated chip (IC) or IC package.

The RF module 227 may transmit/receive, for example, communication signals (e.g., RF signals). The RF module 1327 may include, for example, a transceiver, a power amp module (PAM), a frequency filter, a low noise amplifier (LNA), an antenna, or the like. According to another embodiment of the present disclosure, at least one of the cellular module 1321, the Wi-Fi module 1322, the Bluetooth module 1323, the GNSS module 1324, or the NFC module 1325 may transmit/receive RF signals through a separate RF module.

The SIM 1329 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1330 (e.g., the memory 1230) may include, for example, an internal memory 1332 or an external memory 1334. The internal memory 1332 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1334 may include a flash drive such as a compact flash (CF), a secure digital (SD), a Micro-SD, a Mini-SD, an extreme digital (xD), a MultiMediaCard (MMC), a memory stick, or the like. The external memory 1334 may be operatively and/or physically connected to the electronic device 1301 through various interfaces.

The security module 1336 may be a module which has a relatively higher secure level than the memory 1330 and may be a circuit which stores secure data and guarantees a protected execution environment. The security module 1336 may be implemented with a separate circuit and may include a separate processor. The security module 1336 may include, for example, an embedded secure element (eSE) which is present in a removable smart chip or a removable SD card or is embedded in a fixed chip of the electronic device 1301. Also, the security module 1336 may be driven by an OS different from the OS of the electronic device 1301. For example, the security module 1336 may operate based on a java card open platform (JCOP) OS.

The sensor module 1340 may, for example, measure physical quantity or detect an operation state of the electronic device 1301 so as to convert measured or detected information into an electrical signal. The sensor module 1340 may include, for example, at least one of a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., a red/green/blue (RGB) sensor), a biometric sensor 1340I, a temperature/humidity sensor 1340J, an illumination sensor 1340K, or an ultraviolet (UV) sensor 1340M. Additionally or alternatively, the sensor module 1340 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1340 may further include a control circuit for controlling at least one sensor included therein. In some various embodiments of the present disclosure, the electronic device 1301 may further include a processor configured to control the sensor module 1340 as a part of the processor 1310 or separately, so that the sensor module 1340 is controlled while the processor 1310 is in a sleep state.

The input device 1350 may include, for example, a touch panel 1352, a (digital) pen sensor 1354, a key 1356, or an ultrasonic input device 1358. The touch panel 1352 may employ at least one of capacitive, resistive, infrared, and ultraviolet sensing methods. The touch panel 1352 may further include a control circuit. The touch panel 1352 may further include a tactile layer so as to provide a haptic feedback to a user.

The (digital) pen sensor 1354 may include, for example, a sheet for recognition which is a part of a touch panel or is separate. The key 1356 may include, for example, a physical button, an optical button, or a keypad. The ultrasonic input device 1358 may sense ultrasonic waves generated by an input tool through a microphone 1388 so as to identify data corresponding to the ultrasonic waves sensed.

The display 1360 (e.g., the display 1260) may include a panel 1362, a hologram device 1364, or a projector 1366. The panel 1362 may have a configuration that is the same as or similar to that of the display 1260 of FIG. 12. The panel 1362 may be, for example, flexible, transparent, or wearable. The panel 1362 and the touch panel 1352 may be integrated into a single module. The hologram device 1364 may display a stereoscopic image in a space using a light interference phenomenon. The projector 1366 may project light onto a screen so as to display an image. The screen may be disposed in the inside or the outside of the electronic device 1301. According to an embodiment of the present disclosure, the display 1360 may further include a control circuit for controlling the panel 1362, the hologram device 1364, or the projector 1366.

The interface 1370 may include, for example, an HDMI 1372, a USB 1374, an optical interface 1376, or a D-subminiature (D-sub) 1378. The interface 1370, for example, may be included in the communication interface 1270 illustrated in FIG. 12. Additionally or alternatively, the interface 1370 may include, for example, a mobile high-definition link (MHL) interface, an SD card/multi-media card (MMC) interface, or an infrared data association (IrDA) interface.

The audio module 1380 may convert, for example, a sound into an electrical signal or vice versa. At least a portion of elements of the audio module 1380 may be included in the input/output interface 1250 illustrated in FIG. 12. The audio module 1380 may process sound information input or output through a speaker 1382, a receiver 1384, an earphone 1386, or the microphone 1388.

The camera module 1391 is, for example, a device for shooting a still image or a video. According to an embodiment of the present disclosure, the camera module 1391 may include at least one image sensor (e.g., a front sensor or a rear sensor), a lens, an image signal processor (ISP), or a flash (e.g., an LED or a xenon lamp).

The power management module 1395 may manage power of the electronic device 1301. According to an embodiment of the present disclosure, the power management module 1395 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1396 and a voltage, current or temperature thereof while the battery is charged. The battery 1396 may include, for example, a rechargeable battery and/or a solar battery.

The indicator 1397 may display a specific state of the electronic device 1301 or a part thereof (e.g., the processor 1310), such as a booting state, a message state, a charging state, or the like. The motor 1398 may convert an electrical signal into a mechanical vibration, and may generate a vibration or haptic effect. Although not illustrated, a processing device (e.g., a GPU) for supporting a mobile TV may be included in the electronic device 1301. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 14:
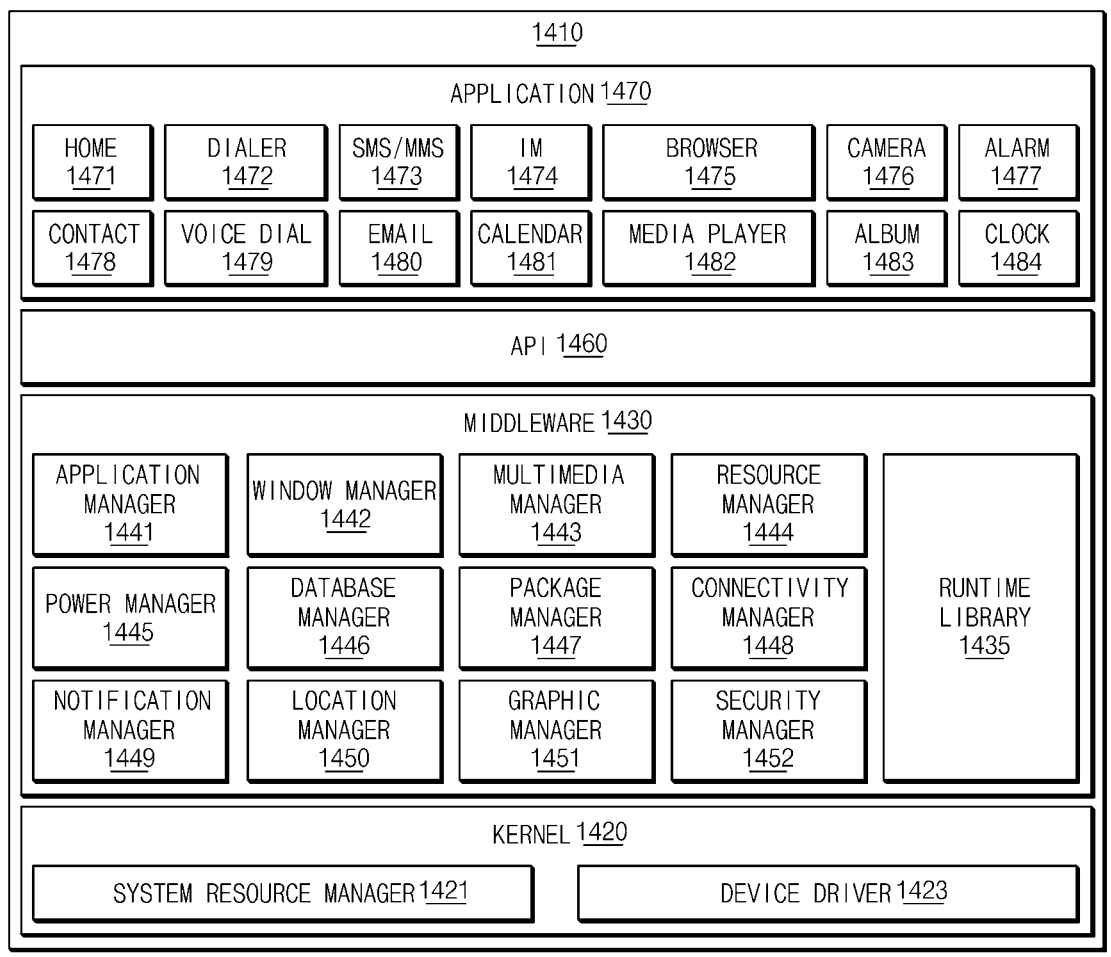
FIG. 14 illustrates a block diagram of a program module according to various embodiments.

FIG. 14 is a block diagram of a program module according to various embodiments.

According to an embodiment, a program module 1410 (e.g., the program 1240) may include an operating system (OS) to control resources associated with an electronic device (e.g., the electronic device 1201) and/or diverse applications (e.g., the application program 1247) driven on the OS. The OS may be, for example, Android, iOS, Windows, Wymbian, or Tizen.

The program module 1410 may include a kernel 1420, a middleware 1430, an application programming interface (API) 1460, and/or an application 1470. At least a part of the program module 1410 may be preloaded on an electronic device or may be downloadable from an external electronic device (e.g., the external device 1202, and the like).

The kernel 1420 (e.g., the kernel 1241) may include, for example, a system resource manager 1421 and/or a device driver 1423. The system resource manager 1421 may perform control, allocation, or retrieval of system resources. According to an embodiment, the system resource manager 1421 may include a process managing part, a memory managing part, or a file system managing part. The device driver 1423 may include, for example, a display driver, a camera driver, a Bluetooth driver, a shared memory driver, an USB driver, a keypad driver, a Wi-Fi driver, an audio driver, or an inter-process communication (IPC) driver.

The middleware 1430 may provide, for example, functions the application 1470 needs in common, and may provide various functions to the application 1470 through the API 1460 such that the application 1470 efficiently uses limited system resources in the electronic device. According to an embodiment of the present disclosure, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager 1454.

The runtime library 1435 may include, for example, a library module used by a compiler to add a new function through a programming language while the application 1470 is executed. The runtime library 1435 may perform a function about input and output management, memory management, or an arithmetic function.

The application manager 1441 may manage, for example, a life cycle of at least one of the application 1470. The window manager 1442 may manage graphic user interface (GUI) resources used on a screen of the electronic device. The multimedia manager 1443 may determine a format utilized for reproducing various media files and may encode or decode a media file using a codec corresponding to the corresponding format. The resource manager 1444 may manage source codes of at least one of the application 1470, and may manage resources of a memory or a storage space, and the like.

The power manager 1445 may act together with, for example, a basic input/output system (BIOS) and the like, may manage a battery or a power source, and may provide power information utilized for an operation of the electronic device. The database manager 1446 may generate, search, or change a database to be used in at least one of the application 1470. The package manager 1447 may manage installation or update of an application distributed by a type of a package file.

The connectivity manager 1448 may manage, for example, wireless connection such as Wi-Fi connection or BT connection, and the like. The notification manager 1449 may display or notify events, such as an arrival message, an appointment, and proximity notification, by a method which is not disturbed to the user. The location manager 1450 may manage location information of the electronic device. The graphic manager 1451 may manage a graphic effect to be provided to the user or a user interface (UI) related to the graphic effect. The security manager 1452 may provide all security functions utilized for system security or user authentication, and the like. According to an embodiment of the present disclosure, when the electronic device (e.g., an electronic device 1201 of FIG. 12) has a phone function, the middleware 1430 may further include a telephony manager (not shown) for managing a voice or video communication function of the electronic device.

The middleware 1430 may include a middleware module which configures combinations of various functions of the above-described components. The middleware 1430 may provide a module which specializes according to kinds of OSs to provide a differentiated function. Also, the middleware 1430 may dynamically delete some of old components or may add new components.

The API 1460 (e.g., an API 1245) may be, for example, a set of API programming functions, and may be provided with different components according to OSs. For example, in case of Android or iOS, one API set may be provided according to platforms. In case of Tizen, two or more API sets may be provided according to platforms.

The application 1470 (e.g., an application program 1247) may include one or more of, for example, a home application 1471, a dialer application 1472, a short message service/multimedia message service (SMS/MMS) application 1473, an instant message (IM) application 1474, a browser application 1475, a camera application 1476, an alarm application 1477, a contact application 1478, a voice dial application 1479, an e-mail application 1480, a calendar application 1481, a media player application 1482, an album application 1483, a clock application 1484, a payment application 1485, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1470 may include an application (hereinafter, for better understanding and ease of description, referred to as "information exchange application") for exchanging information between the electronic device (e.g., the electronic device 1201) and an external electronic device (e.g., the first external electronic device 1202 or the second external electronic device 1204). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1202 or the second external electronic device 1204). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1202 or the second external electronic device 1204) which communicates with the electronic device, an application which operates in the external electronic device, or a service (e.g., a call service or a message service) provided from the external electronic device.

According to an embodiment of the present disclosure, the application 1470 may include an application (e.g., the health card application of a mobile medical device) which is preset according to attributes of the external electronic device (e.g., the first external electronic device 1202 or the second external electronic device 1204). According to an embodiment of the present disclosure, the application 1470 may include an application received from the external electronic device (e.g., the server 1206, the first external electronic device 1202, or the second external electronic device 1204). According to an embodiment of the present disclosure, the application 1470 may include a preloaded application or a third party application which may be downloaded from a server. Names of the components of the program module 1410 according to various embodiments of the present disclosure may differ according to kinds of OSs.

The program module of FIG. 14 may correspond to program module of the server 210 or the user terminal 220 of FIG. 2 described above.

When the program module of FIG. 14 corresponds to the program module of the server 210 of FIG. 2, the three-dimensional application 211 may be included in the application 1470. Fig. In addition, the three-dimensional rendering module 212 and the image synthesis module 214 of FIG. 2 may be included in the graphic manager 1451. The encoding module 215 may be included in the multimedia manager 1443.

Also, when the program module of FIG. 14 corresponds to the program module of the server 210 of FIG. 2, the decoding module 222 may be included in the multimedia manager 1443 and the three-dimensional application 223 may be included in the application 1470. The three-dimensional rendering module 224 may be included in the graphics manager 1451.

According to various embodiments of the present disclosure, at least part of the program module 1410 may be implemented with software, firmware, hardware, or at least two or more combinations thereof. At least part of the program module 1410 may be implemented (e.g., executed) by, for example, a processor (e.g., a processor 1310). At least part of the program module 1410 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1220), the processor may perform functions corresponding to the instructions. The computer-readable storage medium may be, for example, the memory 1230.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. An electronic device comprising:
   at least one processor; and
   a communication circuit operatively connected to the processor,
   wherein the at least one processor is configured to:
      generate a plurality of images corresponding to a plurality of view vectors associated with one point on a virtual three-dimensional space;
      obtain information of a gaze direction of a user corresponding to an external electronic device from the external electronic device via the communication circuit;
      select at least one image corresponding to a view vector making a smallest angle with the gaze direction among the plurality of view vectors;
      set a quality of the at least one image of the plurality of images with a higher quality than remaining images; and
      synthesize the plurality of images including the at least one image.

2. The electronic device of claim 1, wherein the at least one processor is configured to:
  select the at least one image based on a moving direction of the one point as at least a part of the setting of the quality.

3. The electronic device of claim 1, wherein the at least one processor is configured to select the at least one image corresponding to a view vector making a second smallest angle with the gaze direction of the user among the plurality of view vectors.

4. The electronic device of claim 1, wherein the at least one processor is configured to set at least one of settings for a size of a view frustum, settings for a number of rendering light sources, settings for rendering shading, settings for a resolution, settings for a rendering texture resolution, settings for a level of modeling data with respect to the at least one image set to the higher quality, differently from those of the remaining images.

5. The electronic device of claim 1, further comprising:
  a communication circuit operatively connected to the processor,
  wherein the at least one processor is configured to:
    obtain a selection input for an object in the virtual three-dimensional space via the communication circuit; and
    select at least one image containing the object among the plurality of images as the at least one image, as at least a part of the setting.

6. The electronic device of claim 1, wherein the at least one processor is configured to set the at least one image with a high quality based on at least one of a state of the electronic device, a state of an external electronic device communicating with the electronic device, a state of communication between the electronic device and the external electronic device, performance of the electronic device, and performance of the external electronic device.

7. An electronic device comprising:
  a display;
  at least one sensor configured to obtain information of a gaze direction of a user corresponding to the electronic device; and
  at least one processor operatively connected to the display and the at least one sensor,
  wherein the at least one processor is configured to:
    generate a plurality of images corresponding to a plurality of view vectors associated with one point on a virtual three-dimensional space;
    select at least one image corresponding to a view vector making a smallest angle with the gaze direction among the plurality of view vectors;
    set a quality of the at least one image of the plurality of images with a higher quality than remaining images;
    synthesize the plurality of images including the at least one image; and
    display the synthesized image through the display.

8. The electronic device of claim 7, wherein the at least one processor is configured to select at least one image corresponding to a view vector making a second smallest angle with the gaze direction of the user among the plurality of view vectors.

9. The electronic device of claim 7, wherein the at least one processor is configured to set at least one of settings for a size of a view frustum, settings for a number of rendering light sources, settings for rendering shading, settings for a resolution, and settings for a rendering texture resolution, with respect to the at least one image set to the higher quality, differently from those of the remaining images.

10. The electronic device of claim 7, further comprising:
  a user input circuit configured to obtain a selection input for an object in the virtual three-dimensional space from the user,
  wherein the at least one processor is configured to select at least one image containing the object among the plurality of images, as at least a part of the setting.

11. The electronic device of claim 7, wherein at least one image of the plurality of images contains sound, and
  wherein the at least one processor is configured to select at least one image containing the sound among the plurality of images as the at least one image, as at least a part of the setting.

12. The electronic device of claim 7, wherein the at least one processor is configured to select the at least one image based on a moving direction of the one point as at least a part of the setting.

* * * * *